US012717783B2

(12) United States Patent
Ren et al.

(10) Patent No.: US 12,717,783 B2
(45) Date of Patent: Aug. 25, 2026

(54) SYSTEMS AND METHODS TO CLOSE GAPS FOR GRAPH FEATURE ENGINEERING

(71) Applicant: PAYPAL, INC., San Jose, CA (US)

(72) Inventors: Shengjun Ren, Shanghai (CN); Yawei Chen, Shanghai (CN); Sunan Yao, Shanghai (CN); Haifeng Wu, Hunan (CN); Ning Ding, Shanghai (CN); Rong Xu, Shanghai (CN)

(73) Assignee: PayPal, Inc., San Jose, CA (US)

(*) Notice: Subject to any disclaimer, the term of this patent is extended or adjusted under 35 U.S.C. 154(b) by 494 days.

(21) Appl. No.: 18/287,730

(22) PCT Filed: Sep. 18, 2023

(86) PCT No.: PCT/CN2023/119465

§ 371 (c)(1),
(2) Date: Oct. 20, 2023

(87) PCT Pub. No.: WO2025/059806

PCT Pub. Date: Mar. 27, 2025

(65) Prior Publication Data

US 2026/0187068 A1 Jul. 2, 2026

(51) Int. Cl.
*G06F 16/2453* (2019.01)
*G06F 16/901* (2019.01)

(52) U.S. Cl.
CPC .... *G06F 16/24535* (2019.01); *G06F 16/9024* (2019.01)

(58) Field of Classification Search
CPC ....................... G06F 16/9024; G06F 16/24535
See application file for complete search history.

(56) References Cited

U.S. PATENT DOCUMENTS 9,245,233 B2 * 1/2016 Goldschmidt ........... G06N 7/01
10,831,827 B2 * 11/2020 Gifford ............... G06F 16/9024
(Continued)

FOREIGN PATENT DOCUMENTS

CN 113297426 A 8/2021
CN 113850393 A 12/2021
(Continued)

OTHER PUBLICATIONS

International Search Report and Written Opinion of international application No. PCT/CN2023/119465, mailed Dec. 20, 2023, 9 pp.

*Primary Examiner* — Jorge A Casanova
(74) *Attorney, Agent, or Firm* — Greenberg Traurig, LLP

(57) ABSTRACT

A system may perform operations including, for a given seed file, obtaining a first graph query to extract a first set of feature values from a first dataset, extracting, based on a feature calculation time, a sub-graph from the first dataset, obtaining, based on a second logic, a second graph query to extract a second set of feature values from a second dataset, and calculating a parity between the first set of feature values and second set of feature values. The operations may also include obtaining the events from a first data store, the events being filtered based on the given seed file, replaying the events backwards and extracting a third set of feature values, determining whether any of the second set of feature values do not match the second set of feature values, and updating the second set of feature values based on third set of feature values.

20 Claims, 12 Drawing Sheets

(56) References Cited

U.S. PATENT DOCUMENTS

2014/0136520 A1 5/2014 Digana
2018/0246987 A1* 8/2018 Das ......................... G06F 16/23
2020/0327118 A1* 10/2020 Ahmed ................. G06F 16/248
2020/0410003 A1* 12/2020 Simhadri ............ G06F 16/9024
2021/0004374 A1* 1/2021 Xia ....................... G06F 9/4881
2021/0192371 A1* 6/2021 Tago ...................... G06N 20/00
2021/0406779 A1 12/2021 Hu
2022/0382817 A1* 12/2022 White ................. G06F 16/9535
2022/0413992 A1* 12/2022 Nguyen .............. G06F 11/3428
2023/0053063 A1 2/2023 Dai
2024/0202814 A1* 6/2024 Kawahara ........... G06F 16/9024
2024/0419918 A1* 12/2024 Vangala .............. G06F 16/3329

FOREIGN PATENT DOCUMENTS

CN 115495532 A 12/2022
CN 116385256 A 7/2023

* cited by examiner

SYSTEMS AND METHODS TO CLOSE GAPS FOR GRAPH FEATURE ENGINEERING

FIELD

The present disclosure relates to the field of graph analytics. More particularly, to closing gaps for graph feature engineering.

BACKGROUND

Events triggered on a computing network can generate a large amount of data including millions of data points. Processing such a large amount of data for practical applications can be complex and time consuming. Graph data science is a graph analytics approach used to identify patterns based on the relationships and structures in data. These patterns are then typically leveraged to power predictions.

Graph feature engineering involves the process of transforming graph query results into features selected based on a targeted problem and applied to a predictive model. This enables the data's owner such as, for example, an online entity performing commercial transactions on a network, to apply the predictive models to solve for the targeted problems using the graphs.

BRIEF DESCRIPTION OF THE DRAWINGS

Some embodiments of the disclosure are herein described, by way of example only, with reference to the accompanying drawings. With specific reference now to the drawings in detail, it is stressed that the embodiments shown are by way of example and for purposes of illustrative discussion of embodiments of the disclosure. In this regard, the description taken with the drawings makes apparent to those skilled in the art how embodiments of the disclosure may be practiced.

DETAILED DESCRIPTION

Figure 1:
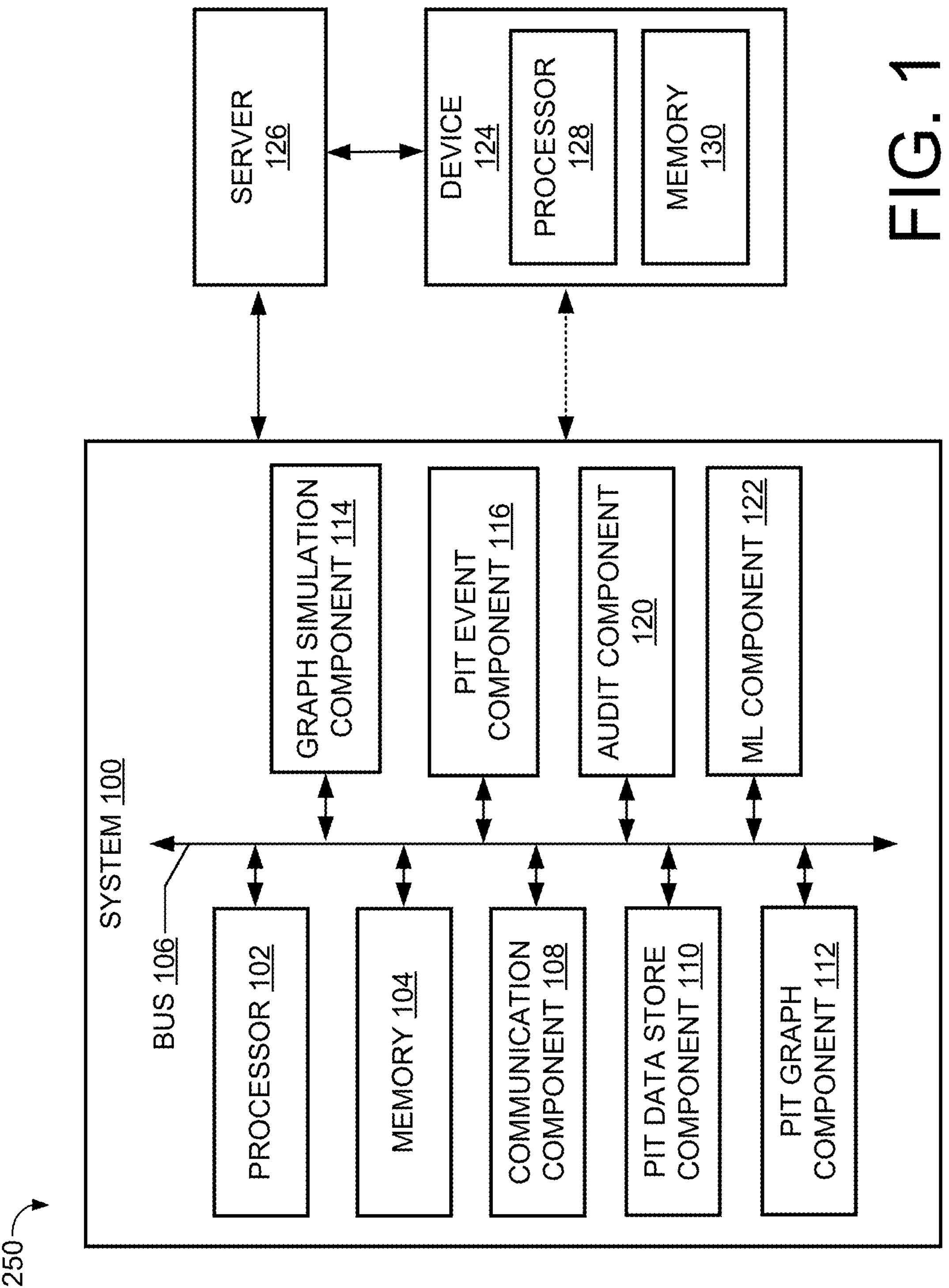
FIG. 1 is a block diagram illustrating a non-limiting example of a system in a computing environment, according to some embodiments.

Graph feature engineering typically includes researching and defining graph features based on a feature engineering logic, which may then be deployed in a live production environment where the implemented logic may be utilized by machine learning ("ML") models or algorithms to solve for underlying problems. The graph data may include historical graph data such as, for example, data generated in the course of operations of an online entity as a result of one or more computing devices performing online commercial transactions utilizing the network and represented as vertices (e.g., nodes) and relationships between the vertices in a graph structure. For example, the data may include transaction data associated with potential malicious activity on a platform and connections to different types of entities represented by vertices and relationships in a graph structure.

Graph feature engineering is ideally performed on historical data to enable defining/modifying graph queries and graph calculations for extracting feature values from graph data with better performance for solving the underlying problem. However, conventional methodologies for graph feature engineering can be limited due to lacking access to large-scale datasets in near-real-time ("NRT"). Although it may be possible to obtain large-scale datasets using conventional methods, it typically requires manually populating the dataset and can also involve long delay times to generate the dataset including millions of data points for determine feature engineering logic.

To avoid manually populating the data or to avoid such long delays to obtain a large-scale dataset, conventional methods for performing graph feature engineering may instead use smaller datasets having a limited number of data points. Alternatively, the graph features can be researched using simulated data or mock data that may be include a subset of the historical data of the network or system and/or may include data that is generated or manipulated by a user (e.g., data scientists) for the purposes of engineering graph features targeting a specific problem, and which may not be representative of the data stored in the system.

Accordingly, it can be difficult to guarantee the parity between an expected feature engineering logic and an implemented feature engineering logic using conventional methodologies. For complex graph feature engineering logic, the feature engineering logic may be designed using one type of coding language and then translated into a second coding language when implementing the logic into the live production environment. Additionally, for NRT graph features where calculations are triggered by streaming events and features values are accessed in an asynchronous manner, a gap occurs between a feature calculation time (e.g., writing time) and feature access time (e.g., reading time) using the conventional methodologies. Specifically, research on graph data can typically only be performed at the feature access time rather than at the feature calculation time due to finding exact calculation times relying on defined feature engineering logic. This leads to inconsistencies in extracting features values from the graph data. Furthermore, performing root cause analysis ("RCA") on any errors that may occur can be difficult and time consuming to resolve. Accordingly, conventional methodologies typically have to manually audit the data when inconsistencies arise to identify gaps between the different logics.

As used herein, the term "feature calculation time" refers to the time when the feature calculation is triggered. As used herein, the term "feature access time" refers to the time when the feature is accessed in production.

Various embodiments of the present disclosure include systems, devices, methods, and computer readable medium for syncing online graph data from multiple data sources into a point-in-time ("PIT") data store to provide large-scale historical graph data. In this regard, the various embodiments of the present disclosure are capable of obtaining and storing in the PIT data store a dataset including several millions of historical live sub-graph data points within a certain defined period of time that can enables efficient and timely research and production of the graph features.

The various embodiments of the present disclosure can include systems for determining a feature engineering logic that may be implemented in a live production environment and utilized by ML models of the system to extract feature values directed to targeted populations from the PIT data store. The system may also validate the parity between the expected logic and the implemented logic and may be used to identify any potential causes of mismatches stemming from the gap between the feature calculation time and the feature access time for extracting the feature values based on the designed logic.

The techniques herein can improve computer performance by providing more efficient techniques for syncing online graph data to provide access to large-scale historical graph data for graph feature engineering purposes. The techniques herein can also improve computer performance by providing more efficient models and techniques for designing the feature engineering logic using large-scale historical data and resulting in more accurate training sets for the predictive models of the system. Moreover, the techniques herein can also improve computer performance by auditing the parity between the design logic and the implemented logic and by mitigating the difficulty in performing RCA to identify any potential causes of mismatches stemming from the gap between the feature calculation time and the feature access time when performing graph simulations to extract the feature values. The techniques herein can also improve computer performance by saving on processor cycles, memory usage, and power usage by those devices. For example, the system may be capable of obtaining graph datasets including several million data points within a shorter time period compared to conventional methods. Accordingly, the techniques herein lead to improved computing systems or networked computing systems that are implemented by one or more computing devices, servers, controllers, other computing devices, and the like.

Among those benefits and improvements that have been disclosed, other objects and advantages of this disclosure will become apparent from the following description taken in conjunction with the accompanying figures. Detailed embodiments of the present disclosure are disclosed herein; however, it is to be understood that the disclosed embodiments are merely illustrative of the disclosure that may be embodied in various forms. In addition, each of the examples given regarding the various embodiments of the disclosure which are intended to be illustrative, and not restrictive.

FIG. 1 is a block diagram illustrating a non-limiting example of system 100, according to some embodiments. The system 100 may include one or more of a variety of components, such as a processor 102, memory 104, bus 106, communication component 108, PIT data store component 110, PIT graph component 112, PIT event component 116, graph simulation component 114, audit component 120, and a machine learning ("ML") component 122. The system 100 utilizes the one or more components to obtain and sync historical graph data from multiple sources and store the data in point-in-time ("PIT") data stores of the memory 104, perform query simulations based on one or more definitions to extract feature values from the data in the PIT data stores, and to calculate a parity between the data output as a result of the query simulations to identify causes of mismatches between the output data.

The system 100 and/or any of the components included in the system 100 may be configured to utilize hardwired circuitry that may be used in place of or in combination with software instructions to implement features consistent with principles of the disclosure. Thus, implementations consistent with principles of the disclosure are not limited to any specific combination of hardware circuitry and software. For example, various embodiments may be embodied in many different ways as a software component such as, without limitation, a stand-alone software package, a combination of software packages, or it may be a software package incorporated as a "tool" in a larger software product. For example, exemplary software specifically programmed in accordance with one or more principles of the present disclosure may be downloadable from a network, for example, a website, as a stand-alone product or as an add-in package for installation in an existing software application. For example, exemplary software specifically programmed in accordance with one or more principles of the present disclosure may also be available as a client-server software application, or as a web-enabled software application. For example, exemplary software specifically programmed in accordance with one or more principles of the present disclosure may also be embodied as a software package installed on a hardware device. In this regard, the system 100 may include any suitable combination of computer-executable hardware and/or computer-executable software to enable system 100 to perform the operations in accordance with the present disclosure.

The system 100 includes processor 102 and memory 104. In some embodiments, the processor 102 may include one or more processors for performing operations as described herein. The memory 104 may be a non-transitory computer readable medium having stored thereon instructions executable by the processor 102 to perform the operations as described herein. The memory 104 may have stored thereon data for use by the other components of the system 100.

The memory 104 may include live data generated based on a business logic. In a non-limiting example, the data stored in the memory 104 includes user behavior data associated with one or more users of a network of the system 100. The system 100 may obtain the data from multiple sources and the system 100 may store the data in one or more PIT data stores. Each one of the PIT data stores may be associated with a production environment of the system 100 or the network of the system 100, as will be further described herein.

Additionally, the one or more other components of the system 100 may utilize the data stored in the memory 104 to perform operations including performing graph simulation to extract feature values from graph data and storing the data provided as output as a result of the graph simulations, and computing a difference between the output datasets to determine any mismatches and to identify gaps between the feature calculation time and feature access time when performing the graph feature engineering.

The data stored in the memory 104 may include, but is not limited to, graph data and feature values corresponding to vertices and edge connections indicative of relationships between different vertices. The data may also include other types of data including user profile data, behavior data, transaction data, catalog data, metadata, machine learning models, other types of data according to a business logic, or any combinations thereof. In some embodiments, the data may be stored on the system 100. In other embodiments, the data may be stored on one or more other computing devices in communicable connection with the system 100, and the system 100 may obtain the data from the one or more other computing devices to perform the operations in accordance with the present disclosure. For example, the data may be obtained from the computing device 124. In other embodiments, the data may be generated as a result of transactions being performed on a network of the system 100 by one or more other computing devices, including computing device 124, and the system 100 may obtain the data from the one or more other computing devices. It is to be appreciated by those having ordinary skill in the art that the data stored in the memory 104 is not intended to be limiting and may include any of a plurality of types of data including those that may not be described in the disclosure.

The system 100 may include one or more components that are communicatively and/or operably coupled to one another to perform one or more functions of the system 100. In some embodiments, each of the components of system 100 may be communicatively or operatively coupled to one another via the bus 106. In other embodiments, each of the components of the system 100 may be communicatively coupled to one another via the communication component 108.

The system 100 may be in communicable connection with computing device 124 for performing the operations. The computing device 124 may include a processor 128 and a memory 130 having stored thereon instructions executable by the processor 128 to perform the operations as described herein. In some embodiments, the computing device 124 may include one or more components similar to the components in system 100 for performing the one or more graph feature engineering techniques as described herein. In some embodiments, the system 100 may include the offline production environment and one or more other computing devices such as, for example, computing device 124 may be in communicable connection with system 100 and may include the online production environment. In some embodiments, the system 100 may be in electronically communicable connection with the computing device 124 through a server 126.

The system 100 may include the communication component 108. The communication component 108 can send and receive data between the one or more components of the system 100. The system 100 may also enable the system 100 to send and receive data between system 100 and other external computing devices, such as computing device 124. In some embodiments, the communication component 108 can send and receive one or more datasets to computing device 124 for distribution of processing loads for performing the one or more techniques of the present disclosure. For example, the query may be sent to computing device 124 to perform the graph query simulation, auditing operations, other operations, or any combinations thereof.

It can be appreciated that the communication component 108 can possess the hardware required to implement a variety of communication protocols (e.g., infrared ("IR"), shortwave transmission, near-field communication ("NFC"), Bluetooth, Wi-Fi, long-term evolution ("LTE"), 3G, 4G, 5G, 6G, global system for mobile communications ("GSM"), code-division multiple access ("CDMA"), satellite, visual cues, radio waves, etc.) The system 100 and/or various respective components can additionally comprise various graphical user interfaces (GUIs), input devices, or other suitable components.

Figure 2:
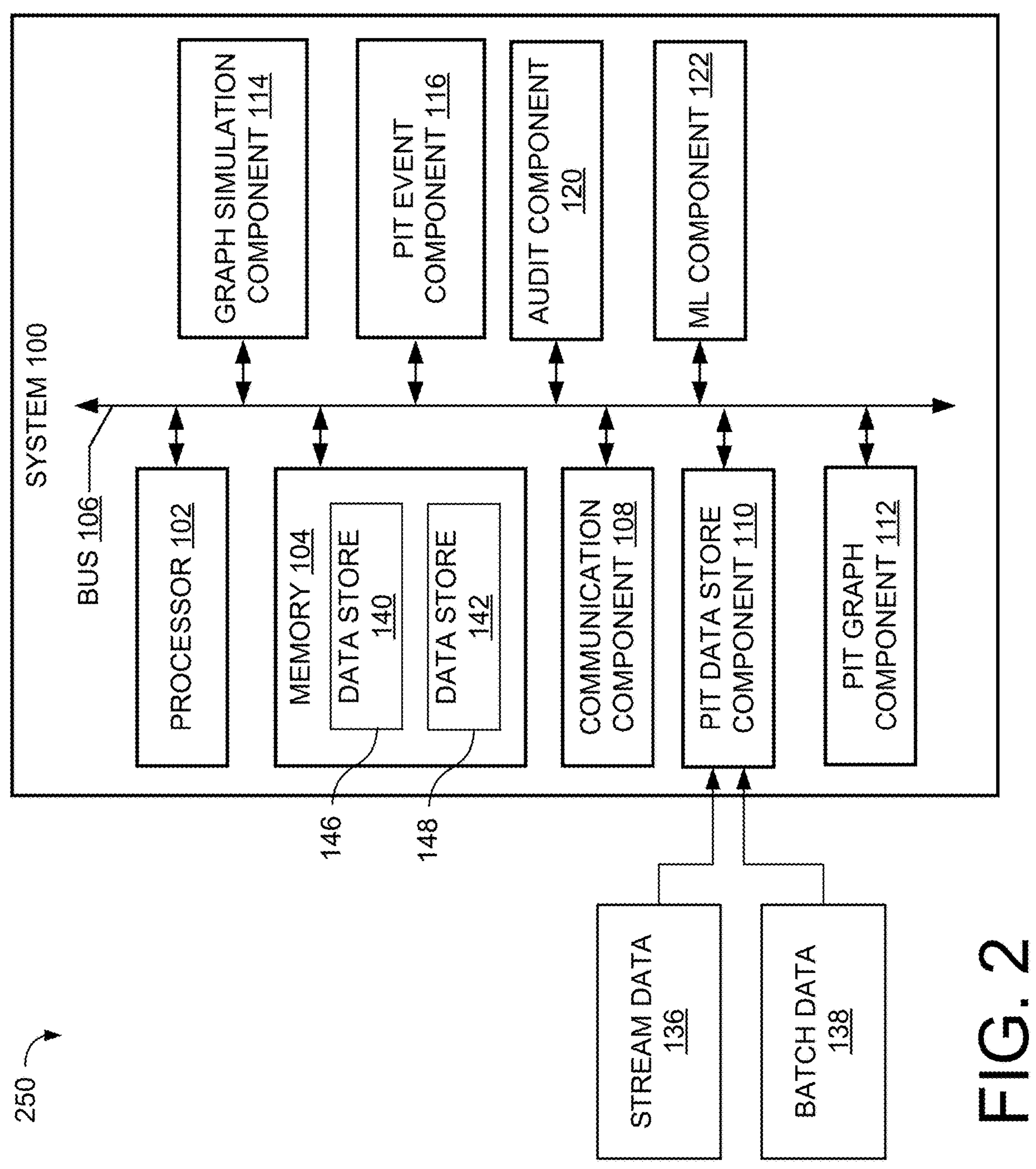
FIG. 2 is a block diagram illustrating another non-limiting example of the system facilitating storing data obtained from one or more sources in the computing environment, according to some embodiments.

The system 100 may include PIT data store component 110. The PIT data store component 110 obtains event data generated based on events occurring on the network associated with system 100 and the PIT data store component 110 stores the obtained data in the memory 104. In some embodiments, the PIT data store component 110 obtains and stores the data in one or more data stores in memory 104. The PIT data store component 110 may store the data in the one or more data stores to provide the other components of system 100 with access to the event data and to enable designing graph feature engineering at the system 100 using large scale historical graph data. The data obtained by the PIT data store component 110 and stored in the data stores of memory 104 may include batch data, streaming data, or both, according to some embodiments. In some embodiments, and as shown in FIG. 2, the PIT data store component 110 obtains the data and stores the data in PIT data store 140. In other embodiments, the PIT data store component 110 obtains the data and stores the data in data store 142. In some embodiments, the PIT data store component 110 obtains the data and stores the data in data store 140 and data store 142.

The system 100 and the PIT data store component 110 may obtain the data corresponding to events occurring in the network of system 100 and the PIT data store component 110 may store the data in the data stores as PIT graph data tables including snapshots continuously updated with data from multiple points in time rather than only including a snapshot of one point in time and that is not updated until a next batch update period. Whenever there is a change to the graph data in the data store 142 of the online production environment 148, the PIT data store component 110 will generate a binlog (e.g., change log) in the offline environment, which may be utilized by the graph simulation component 114 to replay the change, as will be further described herein.

The system 100 may include the PIT graph component 112. The PIT graph component 112 may include one or more PIT graph engines such as, for example, PIT graph engine 170 as shown in FIG. 2. The PIT graph component 112 may be configured to apply the one or more PIT graph engines to data such as, for example, data stored in the memory 104 by the PIT data store component 110 and extract one or more subgraphs 178 (FIG. 5) targeting interested populations based on the data. In some embodiments, the subgraphs 178 may be extracted from the data by the PIT graph component 112 based on definitions 172 (FIG. 5) provided as input to system 100, as will be further described herein. The definitions 172 may include, but may not be limited to, user behavior data, event data, metadata, edge relationships, PIT, other properties, or any combinations thereof, according to some embodiments.

The system 100 may include the graph simulation component 114. Based on a given seed file 174 (FIG. 6) and/or query template 176 (FIG. 6), the graph simulation component 114 may apply one or more models to the historical graph data in the data stores to identify vertices and to extract one or more feature values. In some embodiments, the one or more feature values extracted from the data in the data store may include new feature values generated based on events occurring on the network of system 100. In other embodiments, the one or more feature values may include updated feature values. The system 100 may render the query based on the provided definitions and extracts the one or more feature values from the historical graph data and system 100 provides the output dataset including the extracted data.

The seed file 174 may include one or more definitions 172, which may be directly input to the system 100 by a user responsible for performing the graph feature engineering on the system 100, according to some embodiments. Alternatively, the definitions may be obtained by the system 100 from a computing device in communicable connection with the system 100. In other embodiments, the system 100 can obtain the definitions from one or more other computing devices configured to display a user interface ("UI") that enables the user to input the definitions into the UI and to send the definitions to the system 100.

Figure 10:
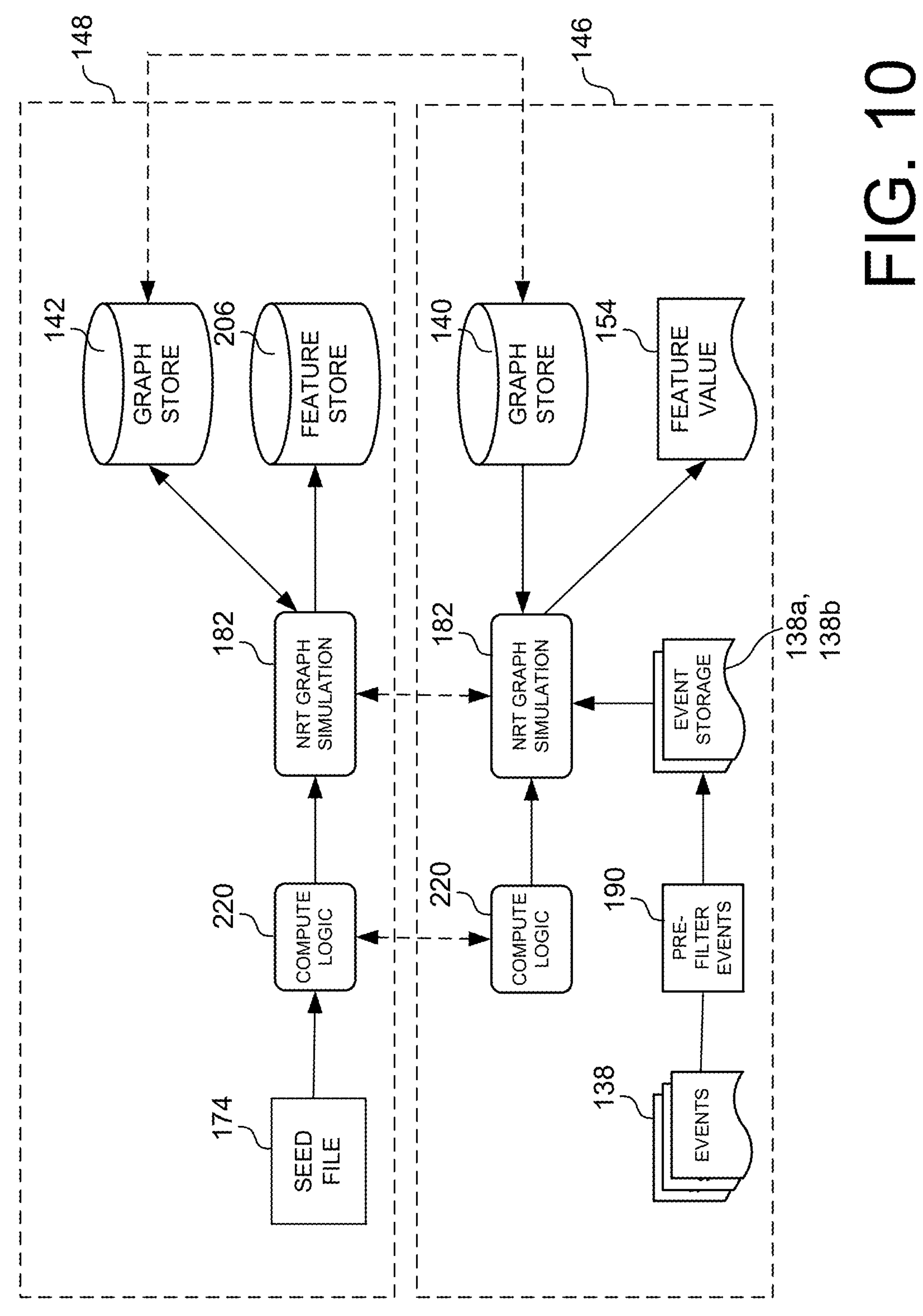
FIG. 10 is a block diagram illustrating the portion of the system that facilitates engineering graph features by performing graph simulations in different environments, according to some embodiments.

The system 100 may include the PIT event component 116. When the graph simulation component 114 performs graph simulations, the PIT event component 116 simulates events as they occurred in online production environment 148 (FIG. 10). If the graph features in the data in data store 140, as shown in FIG. 2, is updated by streaming events, in order to simulate the live behavior of online production environment 148, the PIT event component 116 leverages the historical graph data and replays the events to obtain the simulated feature values using the graph simulation component 114, and which may be a similar value as that occurred in the online production environment 148. The event replay capability enables the system 100 to account for differences between the feature calculation time and the feature access time and the asynchronous manner in which features are accessed.

The system 100 includes the audit component 120. The audit component 120 calculates a parity between an implemented logic and expected logic by comparing the output data from the graph simulations performed using the different logics. Calculating the parity may include determining a match rate between the output from each of the different graph simulations, according to some embodiments. Calculating the parity may also include analyzing the match rates to determine a mismatch between the outputs of the graph simulations to enable the system 100 to identify gaps between the implemented and expected logics. For example, the audit component 120 may determine a mismatch between the feature engineering logic designed using one type of coding language and the feature engineering logic of a second coding language when implementing the designed feature engineering logic into the online production environment 148.

The system 100 includes the ML component 122. The ML component 122 may include one or more models configured to obtain training data including one or more feature values and apply the model to a dataset to identify patterns in graph data to solve for the underlying problem. In some embodiments, the ML component 122 may include one or more models to enable the graph simulation component 114 to perform the graph query simulation on the offline PIT data store and/or the online PIT data store. The ML component 122 may also include one or more models configured to obtain the one or more feature values and configured to be implemented into the online production environment to be applied to live data and/or historical data to identify patterns in the data that solve for the underlying problem. For example, the ML component 122 may include a model having a base dataset including feature values and the ML component 122 may obtain a training dataset from the graph simulation component 114 and iteratively combine the feature values from the base dataset with the feature values from the training dataset to produce a new model as output to provide improved performance by the models in identifying patterns in the data based on the previous data and the training data.

In this regard, the system 100 may apply the one or more models of the ML component 122 to historical and/or streaming data in the online production environment 148 to perform a variety of actions based on objectives solving for targeted problems using graph data. For example, the one or more models may be leveraged to identify patterns of fraudulent activity in the network of system 100. In this regard, training the one or more models with the feature values engineered using the one or more components of system 100 enables the models to take automated actions with high degrees of confidence. In some embodiments, the ML component 122 may apply a utility-based analysis to weigh the benefit of acting in response to a correct determination of fraud versus the risk of acting in response to a false positive determination of fraud and may perform one or more further actions based on the analysis. In other embodiments, the ML component 122 may apply a probabilistic or statistical-based analysis in connection with the foregoing and/or the following as will be further described herein.

FIG. 2 is a block diagram illustrating another non-limiting example of the system 100 storing data obtained from one or more sources in a computing environment 250 of FIG. 1, according to some embodiments. System 100 may obtain event data generated in response to operations performed on a network of system 100. The event data may include graph data produced as a result of performing online transactions on the network of system 100. For example, the graph data may be generated as a result of a computing device associated with a user (e.g., online retailer) conducting online transactions to sell goods and services on the network of system 100. In some embodiments, the system 100 may obtain the graph data from one or more other computing devices which is generated as a result of the other computing devices engaging in operations on the network of system 100.

The system 100 obtains the graph data and stores the graph data into memory 104. The graph data may include streaming data 136 and batch data 138, according to some embodiments. The streaming data 136 may be obtained by system 100 as the events are triggered on the network of system 100. In this regard, the system 100 may continuously receive streaming data 136 as events are occurring on the network of system 100. For example, the system 100 may continuously obtain the streaming data 136 as events are triggered by one or more other computing devices, and obtain the batch data 138 at periodic intervals, and the system 100 and/or PIT data store component 110 may store the streaming data 136 into data store 140 of offline production environment 146.

Furthermore, the system 100 obtains batch data 138 in batches or periodic intervals rather than being continuously obtained by the system 100 as the events are triggered. Additionally, the batch data 138 may be obtained by the system 100 while offline when processing demand is lower than during higher periods, while the streaming data 136 may be directly input into the memory 104 as the data is generated and obtained by system 100. For example, the system 100 may obtain the batch data 138 at a certain time of day when the network activity is lower than at peak demand times.

The memory 104 may include one or more data stores such as, for example, data store 140 and data store 142. The system 100 obtains the streaming data 136 and batch data 138 and may store the data into the one or more data stores of the memory 104. In some embodiments, data store 140 may be associated with the offline production environment 146 and data store 142 may be associated with online production environment 148. The data store 140 may be associated with the offline production environment 146 of system 100, and where the design logic is applied to research and validate graph features. The data store 142 may be associated with an online production environment 148 where the implemented logic is applied to validate graph features and to productize the graph features, as will be further described herein.

The system 100 and PIT data store component 110 obtains the streaming data 136 and batch data 138 and stores the data in the data stores of memory 104. In some embodiments, the PIT data store component 110 may obtain the data input to system 100 and may store the streaming data 136 and batch data 138 in data store 140 of the offline production environment 146 as historical graph data to enable utilizing the offline production environment 146 for designing graph engineering features. In addition, the PIT data store component 110 may obtain the data input to system 100 and may store the latest data value in data store 142. In some embodiments, the data store 142 may only retain the latest data value obtained based on the streaming data 136 and batch data 138. For example, data store 142 may only contain the latest data value obtained by the PIT data store component 110 and the data value may get overwritten as soon as the PIT data store component 110 obtains new event data and stores the data in data store 142. Only the latest streamed value may be stored in data store 142 of online production environment 148 so that the system 100 may simulate live events that have occurred in online production environment 148, the PIT event component 116 leverages the historical graph data stored in data store 140 by PIT data store component 110 and replays the events to obtain the simulated features values as was streamed to online production environment 148.

Figure 3:
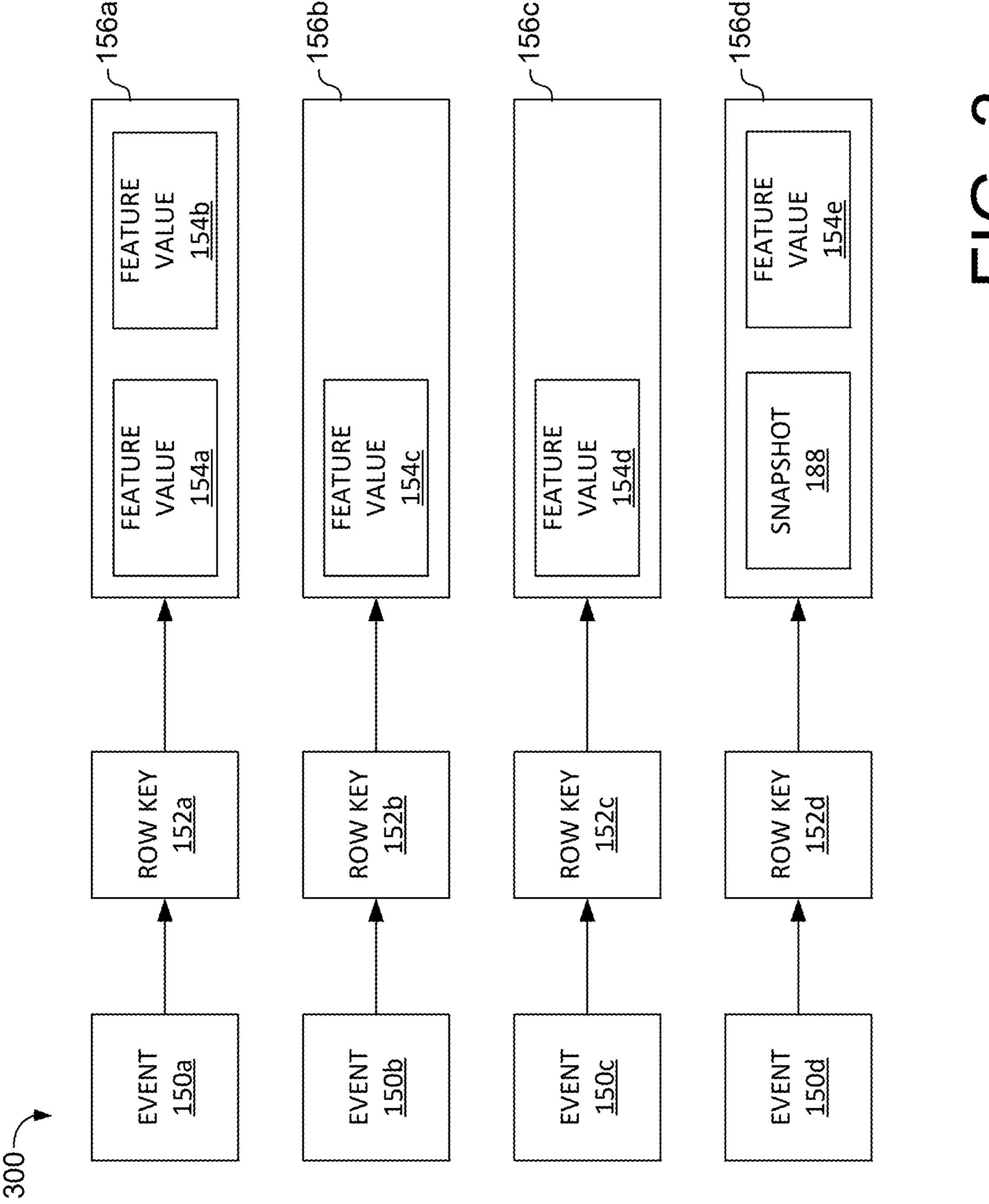
FIG. 3 is a flow diagram illustrating the system storing obtained graph data as data tables, according to some embodiments.

FIG. 3 is a flow diagram 300 illustrating the system 100 storing obtained graph data in data tables, according to some embodiments. The system 100 may obtain the streaming data 136 and/or the batch data 138 (shown in FIG. 2) and the system 100 may store the data in the memory 104.

Referring to FIG. 3, the data obtained by system 100 may include event 150*a*, event 150*b*, event 150*c*, and event 150*d* (hereinafter collectively referred to as event 150) and correspond to vertices that may be created, updated, and/or removed in the graph data. The system 100 may store the data as graph representations including the events 150 corresponding to when a vertex, or entity, is created, updated, and/or removed. The system 100 obtains the data corresponding to events 150 and assigns row key 152*a*, row key 152*b*, row key 152*c*, and row key 152*d* (collectively referred to as row key 152) to each respective event 150. The system 100 may also parse the properties of each of the events 150 and obtain updates/changes to feature values 154*a*, feature values 154*b*, feature values 154*c*, feature values 154*d*, and feature values 154*e*, hereinafter referred to as feature values 154. The system 100 may extract the feature values and store the feature values 154 into a column of the data table based on the row key 152. In some embodiments, the system 100 may also create snapshots 158 including all the properties of an event 150, such as event 150*d* as shown in FIG. 3.

The data obtained by the system 100 may be represented as data tables including journal 156*a*, journal 156*b*, journal 156*c*, journal 156*d*, and journal 156*e*, hereinafter collectively referred to as journals 156. The data tables may also include snapshots 158. The journals 156 may be triggered by events 150 in the obtained data and may correspond to updates to feature values 154 indicative of changes to the properties associated with a vertex. For example, the feature values 154 may be indicative of new edge relationships connecting a vertex and other vertices in the graph representation. Each time an event 150 occurs on the network of system 100, a binlog including a delta value is created, which triggers the journal 156. Based on the event 150, the system 100 may extract the feature values 154 from the data, and the system 100 may assign the extracted feature values 154 to a row of the data table as a column. For example, the event 150 may correspond to an online commercial transaction of a seller conducting an online transaction for their goods or services on the network of system 100 and may include new or updated feature values 154 based on the seller's banking account information, the feature values 154 corresponding to changes to the relationship between the seller and the seller's account information and that is stored as a column in the row associated with the respective event 150.

The graph data may also include context data associated with each event 150. In some embodiments, the context data may include a timestamp corresponding to a PIT when the event 150 occurred. For example, in some embodiments, the PIT timestamp enables the graph simulation component 114 to replay the change when validating the feature engineering logic.

Based on the graph data, the system 100 may create snapshots 158 corresponding to a vertex status at a specific PIT. The snapshots 158 carries all the previous updates (replayed and consolidated historical updates), inserted as a column (snapshot) with PIT inside the row to prevent a record from including too many columns. In some embodiments, the snapshot column may be stored in a cache layer to speed up the querying or to a different table so that different time to live (TTL) strategies can be applied. The PIT graph schema may be stored in another table, with row key=graph name and PIT, in some embodiments.

The system 100 may read the obtained data in response to a graph query 200, which one or more events 150 and the corresponding feature values 154 to extract based on the PIT timestamp. For each event 150 defined in the graph query 200, the system 100 may parse the vertex for its latest version snapshot 158. The system 100 may also determine the vertex does not include a snapshot 158 for its previous versions and the system 100 may read the previous versions, replays, and consolidated historical updates, and the system 100 may update the snapshot 158 associated with the event 150 to the latest version. If the vertex includes the snapshot 158 from the previous version, the system 100 may cache the snapshot 158 locally or in the cache layer. In this regard, the system 100 may be configured to provide a snapshot generation strategy that can help with graph data injection for data that may only carry the update columns without snapshots. As such, the system 100 may create a snapshot 158 for each respective event 150 in the graph query 200 if no snapshot column is found for the level of the change PIT. Further, the system 100 may update the snapshot 158 if there is information needing update to the previous rows.

For each event 150 included in the data obtained by the system 100, the system 100 may associate a unique identifier with each event 150. In some embodiments, the unique identifier may be a row key 152 corresponding to a particular row of the data table, according to some embodiments. The row key 152 may include a SALT, graph name, vertex label, vertex ID, PIT timestamp, or any combinations thereof, according to some embodiments. The SALT allows for even distribution of the one or more events 150 in the data table.

The system 100 enables graph data access including reading and writing capabilities. To query a vertex, for example, the graph name, vertex label, vertex ID, and/or PIT may be used to perform a scan query for the vertex record. Based on the vertex's schema, the properties/edges can be parsed for updates or snapshots from the record's columns. Further, if the snapshot is stored separately (e.g., not in the record), a get query can be performed once the PIT of rows is obtained. The system 100 may also obtain, based on the query, adjacent vertex IDs based on the edges of the queried vertex and the system 100 may also query the adjacent vertices' labels, IDs, and PIT. The system 100 may keep traversing vertices until the query is complete or steps limits are reached. Accordingly, the system 100 may read the required properties from the queried vertices to perform the other operations in accordance with the present disclosure. It is to be appreciated by those of ordinary skill in the art that the system 100 may perform optimizations for avoiding duplicate reading/processing based on the change log and snapshots.

Based on the obtained streaming data 136 and the batch data 138, the system 100 may update the data in the columns of the data table. In this regard, the system 100 may insert changes to the one or more feature values 154 as a new column in the row. In some embodiments, the row key may include a timestamp. The timestamp may be formatted with levels including year, month, hour, second, millisecond, other levels, or any combinations thereof.

Figure 4:
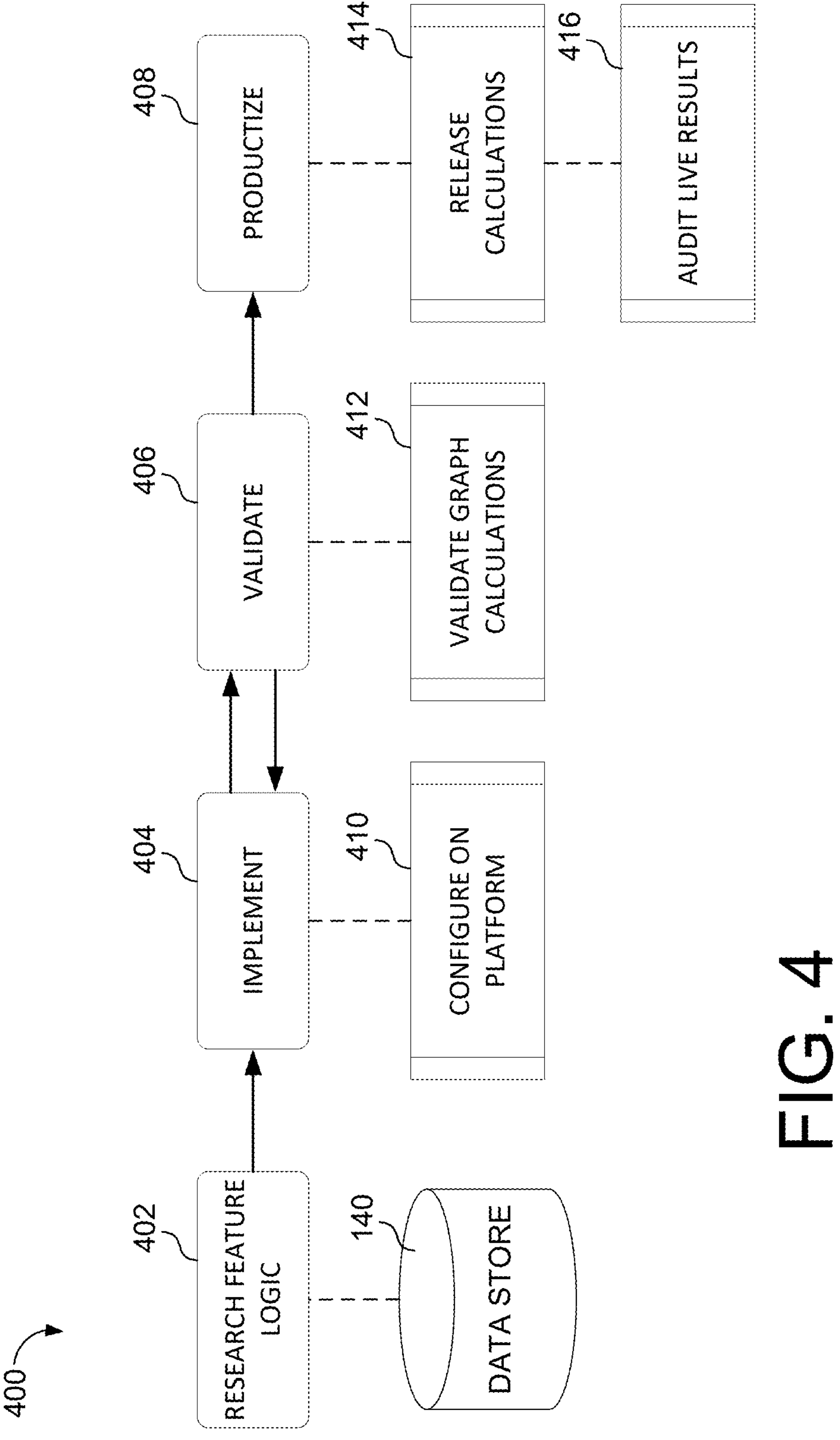
FIG. 4 is a flow diagram illustrating a computer-implemented method for engineering graph feature logic, according to some embodiments.

FIG. 4 is a flow diagram illustrating a computer-implemented method 400 for engineering graph feature logic, according to some embodiments.

The system such as, for example, system 100 (shown in FIG. 1) may be configured to design feature logic targeting interested populations based on graph data. Designing the feature logic may include researching 402 a feature logic, implementing 404 the logic into a live production environment of the system 100, validating 406 the implemented logic by computing the parity between the designed logic and the implemented logic, and productizing 408 the feature engineering logic into the system 100 and/or other computing devices of the network of system 100.

Researching 402 the graph calculations may include selectively defining/modifying candidate graph queries 200 (shown in FIG. 7) that target interested populations from graph data extracted from data store 140, define/modify graph calculations 202 (FIG. 7) for performing graph simulations 182 on the subgraph, and determining whether the graph simulations 182 extract feature values 154 associated with the interested populations, as will be further described herein. For example, researching 402 the graph calculations may include engineering graph queries that can extract a subgraph from historical graph data that includes previously unidentified relationships between nodes targeting users that are fraudulent sellers posing as "new" users on the network of system 100 based on features associated with the fraudulent sellers and the "new" users.

Once the graph calculations targeting the interested populations are determined, the system 100 may implement 404 the feature engineering logic including the graph calculations by configuring 410 the graph calculations into a logic of the platform. For example, the graph calculations may be configured into an online production environment 148 (shown in FIG. 2) of system 100. In this regard, to configure 410 the graph calculations into the platform of system 100, the graph calculations may be stored into one or more data stores of the memory 104 based on the feature engineering logic. In some embodiments, the graph calculations may be stored in a feature data store 206 (shown in FIG. 10). The system 100 may utilize the graph calculations to perform graph query simulations on the historical graph data stored in the data store 142 and to target the interested populations.

The system 100 may also validate 406 the feature engineering logic by computing the parity between the designed logic and the implemented logic. In some embodiments, validating 406 the feature engineering logic may include validating the graph calculations 412 by running graph simulations based on the designed logic (e.g., in an offline production environment) and on the implemented logic (e.g., in an online production environment) and comparing the extracted feature values 154. Additionally, validating 406 the feature engineering logic between the designed logic and implemented logic enables the system 100 to identify when the designed feature engineering logic may include gaps between the feature calculation time and the feature access time. In this regard, the system 100 may identify when the feature values 154 extracted from the data in the data store 140 during a graph simulation performed using the designed logic may not match the updated feature values 154 from the graph simulation performed using the implemented logic and based on the data stored in the data store 142.

The engineered logic may be productized 408 into the system 100 by releasing the graph calculations 414 into the production environment 148 and by storing the graph calculations into the data store 142 for targeting the interested populations based on the data of the network of system 100 and/or one or more other networks. The released graph calculations 414 may then be applied to live graph data in the online production environment 148 to identify patterns targeting interested populations. Additionally, the graph calculations may be released into the online production environment 148 to audit the graph calculations using live results 416 obtained from applying the graph calculations to the graph data stored in the online production environment 148.

Figure 5:
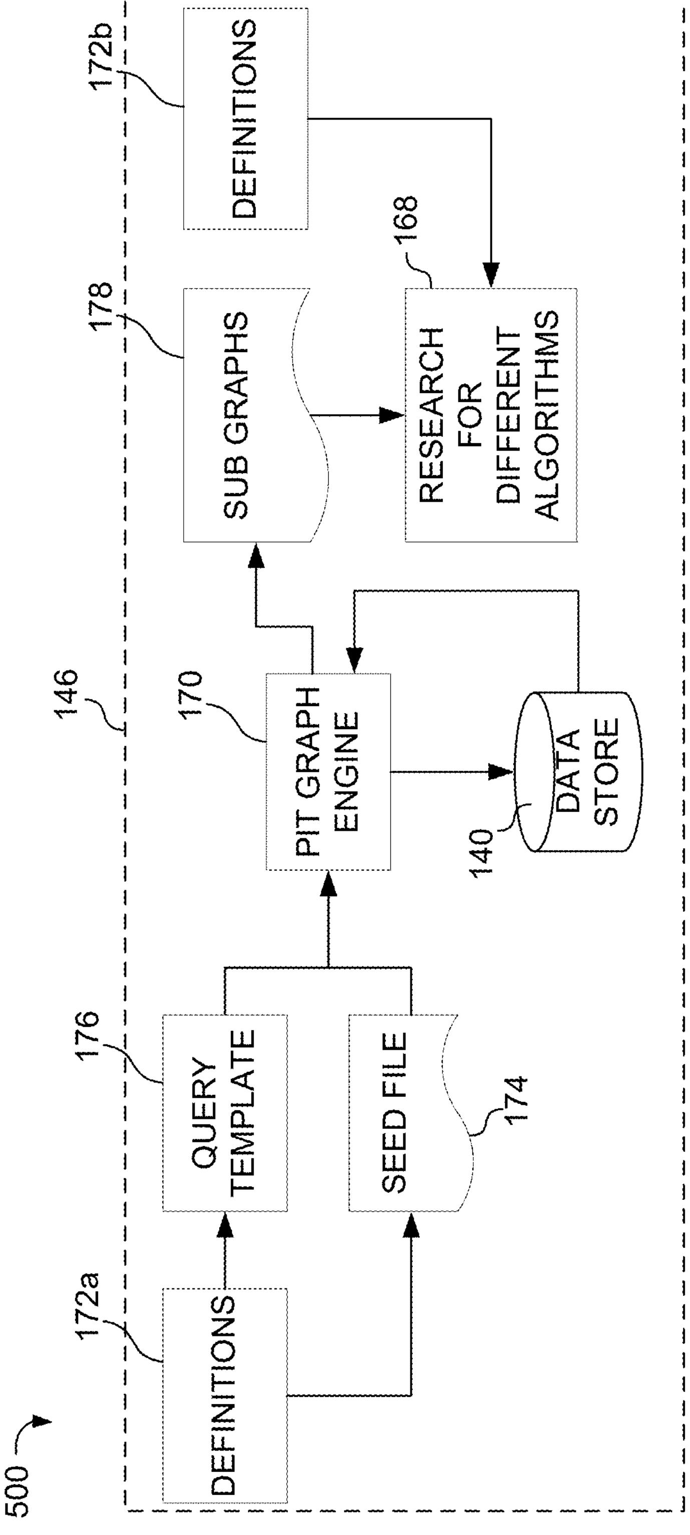
FIG. 5 is a block diagram illustrating the system that facilitates performing graph queries, according to some embodiments.

FIG. 5 is a block diagram 500 illustrating the system 100 facilitating performing graph queries, according to some embodiments.

The system 100 (e.g., PIT graph component 112) may include a PIT graph engine 170 configured to obtain one or more definitions 172 and extract one or more subgraphs 178 from a data store such as, for example, data store 140 based on the one or more definitions 172. In this regard, the system 100 may obtain the one or more definitions 172 and the system 100 may parse a seed file 174 and a query template 176. The PIT graph engine 170 may obtain the seed file 174 and query template 176 and generate one or more subgraphs 178 as output. In some embodiments, the PIT graph engine 170 may obtain the seed file 174 and the query template 176 and modify/define a graph query 200 for extracting a subgraph 178 as output from one of the data stores of the memory 104. The definitions 172 may include, but may not be limited to, user behavior data, event data, metadata, edge relationships, PIT, other properties, or any combinations thereof, according to some embodiments.

The query template 176 may be a configurable template based on the business logic of the user, according to some embodiments. For example, the query template 176 may define transactions involving a certain product or certain type of product being sold by a user of the network of system 100. In other embodiments, the query template 176 may be one of a plurality of pre-configured templates selected based on the business logic of the user. For example, the query template 176 may be configured to identify one or more feature values 154 from the historical graph data corresponding to completed transactions with a certain user's website.

Referring to FIG. 5, the system 100 may obtain definitions 172*a* and 172*b* and the PIT graph engine 170 may perform a graph query 200 for each of the definitions 172*a* and 172*b* and produce a respective subgraph 178 as output, according to some embodiments. The subgraphs 178 may be used for researching different graph calculation algorithms 168. In this regard, the system 100 may obtain one or more sets of definitions directed towards interested populations and the system 100 may produce as output a subgraph for each corresponding seed file 174 and/or query template 176 parsed from the set of definitions.

Figure 6:
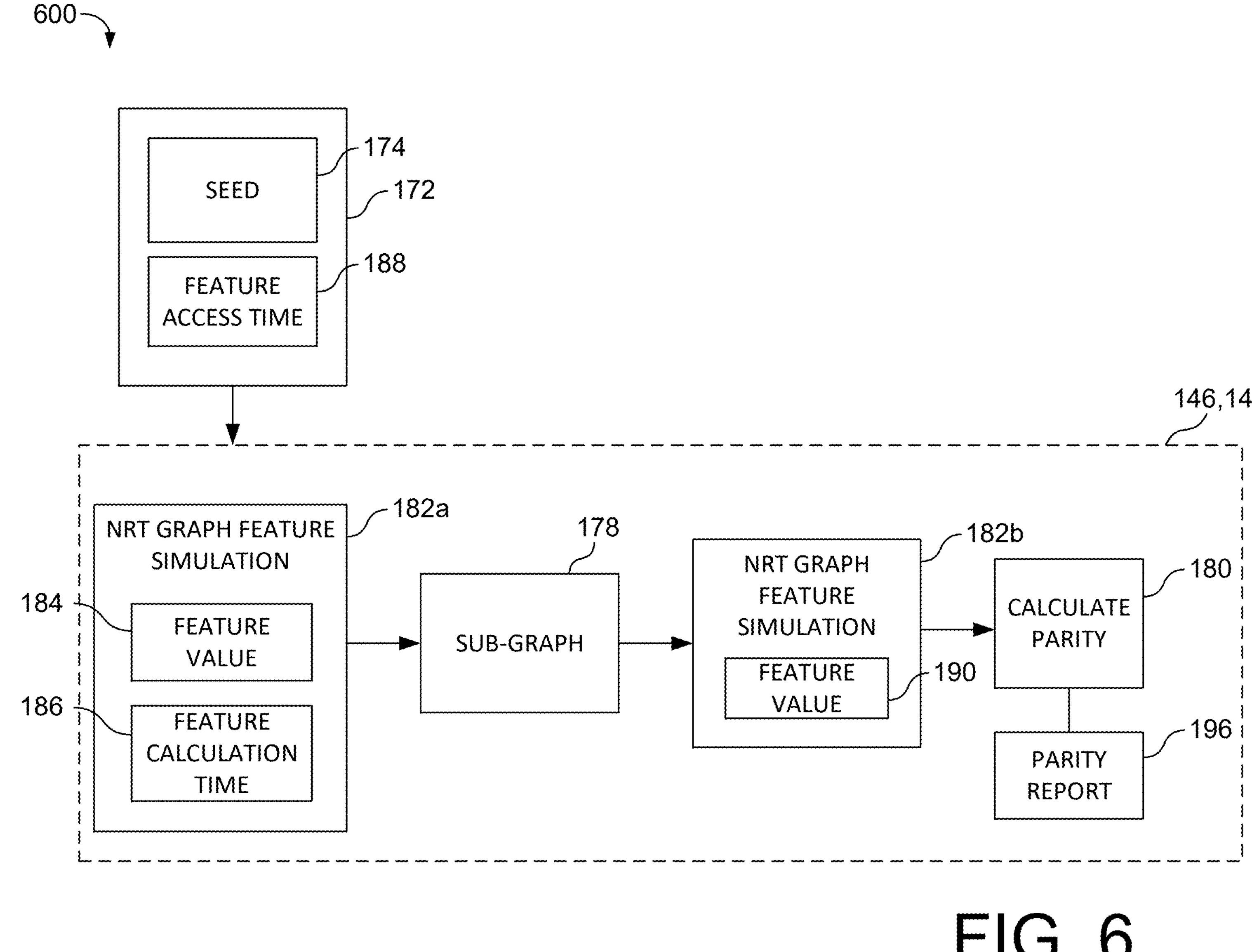
FIG. 6 is a block diagram illustrating the system that facilitates validating graph feature logic, according to some embodiments.
Figure 7:
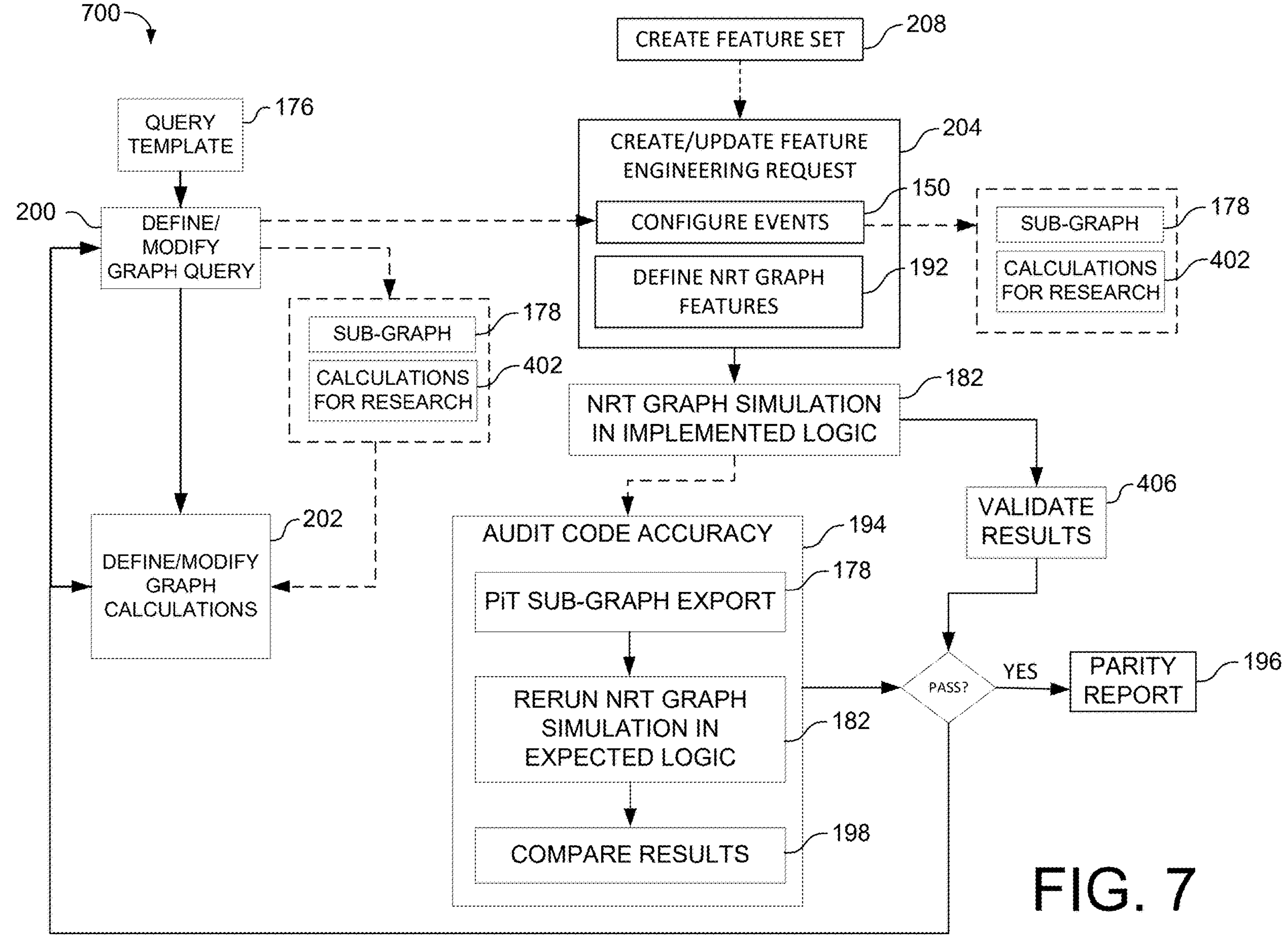
FIG. 7 is a flow diagram illustrating the system that facilitates engineering graph feature logic and validating the graph feature logic, according to some embodiments.

FIG. 6 is a flow diagram 600 illustrating the system 100 facilitating validating the graph feature logic, according to some embodiments. FIG. 7 is a flow diagram 700 illustrating the system 100 facilitating engineering graph feature logic and validating the graph feature logic, according to some embodiments. Unless specifically referenced, FIGS. 6 and 7 will be described collectively.

The system 100 may validate 406 (shown in FIG. 4) the implemented logic by computing the parity 180 between the designed logic and the implemented logic. To validate 406 the different logics, the system 100 may, based on a seed file 174, perform NRT graph simulations 182 with the implemented logic and with the design logic. The seed file 174 may include one or more definitions 172. In some embodiments, the one or more definitions 172 may define one or more events 150 targeting interested populations. In some embodiments, the one or more definitions 172 may include a feature access time 188 defining the PIT for when to access the one or more events 150. The one or more definitions 172 may also include other context parameters in accordance with the present disclosure.

Based on the seed file 174 and the feature access time 188, the system 100 performs NRT graph simulation 182*a* with the implemented code and extracts feature values 184 from the online production environment 148. The system 100 may also determine a feature calculation time 186 for extracting (e.g., reading) the one or more feature values 184 from the data store 140. Based on the feature calculation time 186 provided as output from the NRT graph simulation 182*a* performed with the implemented code and based on the seed file 174, the system 100 exports a subgraph 178 representation including the events 150 and feature values 154 extracted at the feature calculation time 186.

Based on the subgraph 178 and/or based on the seed file 174 as input, the system 100 performs NRT graph simulation 182*b* with the expected logic to extract one or more feature values 190 from the historical graph data in data store 140. The system 100 may then perform a comparison and validate 406 (shown in FIG. 4) the design logic by calculating the parity 180 between the feature values 184 and feature values 190. Based on the calculating the parity 180, the system 100 may generate a parity report 196 as output detailing one or more factors such as, for example, overall match rate, match rate for each feature, mismatch details, recommendations and/or clues for identifying mismatches, other information, or any combinations thereof.

The parity report 196 may determine an overall match rate between the extracted one or more feature values 184 with the implemented logic and the extracted one or more feature values 190 with the design logic. In some embodiments, the parity report 196 may determine a match rate for each feature. In other embodiments, the parity report 196 may also determine mismatch details. In yet other embodiments, the system 100 may analyze the one or more feature values 184 and the one or more feature values 190 provided as output based on performing the NRT graph simulations 182*a* and NRT graph simulation 182*b*, respectively, and the system 100 may also provide recommendations and clues as to potential causes of the mismatch.

Referring to FIG. 7, the system 100 may be configured for code-based NRT graph feature engineering and config-based NRT graph feature engineering. For code-based NRT graph feature engineering, the system 100 may research 402 (shown in FIG. 4) a feature logic by defining/modifying graph queries 200 and defining/modifying graph calculations 202 directed to targeting the interested populations. Based on the defined or modified graph query 200, the system 100 may export subgraph 178 including events 150 and corresponding feature values 154 indicative of edge relationships from the historical graph data in data store 140 and determine graph calculations 202 to be used for research 402 purposes. In some embodiments, the system 100 may treat the input PITs defined in the query template 176 as writing PITs.

The system 100 may also, based on the query template 176, obtain the defined/modified graph query 200 and create/update a feature engineering request 204 to onboard the feature engineering. In some embodiments, the feature engineering request 204 may be onboarded into a data store such as, for example, feature data store 206 (shown in FIG. 10). Creating/updating the feature engineering request 204 includes configuring events 150 and defining NRT graph features 192. In some embodiments, defining the NRT graph features 192 includes defining a feature name and a data type.

The system 100 may, based on the configured events 150, export subgraph 178 including the events 150 and corresponding feature values 154 indicative of edge relationships from the historical graph data in data store 142. In some embodiments, the system 100 may treat the input PITs defined in the query template 176 as reading PITs. The system 100 may obtain the subgraph 178, which may be utilized by the system 100 for researching 402 the graph calculations 202 in the offline production environment 146.

The system 100 may validate 406 (shown in FIG. 4) the feature engineering logic. Based on the feature engineering request 204 including the configured events 150 and the NRT graph features 192, the system 100 may perform NRT graph simulations 182 in the implemented logic such as, for example, in online production environment 148 (shown in FIG. 10) using the seed file 174 and reading PITs as input. The system 100 performs the NRT graph simulation 182 with the implemented logic and may extract the one or more feature values 184 from the graph data in the data store 142 and may determine a feature calculation time 186 for extracting the one or more feature values 184 as output. In some embodiments, the NRT graph simulation 182 may also provide one or more context parameters as output. In other embodiments, the context parameters may include the feature calculation time 186.

The system 100 may also audit the accuracy 194 between the design logic and the implemented logic. In this regard, the system 100 may obtain the seed file 174 and the subgraph 178 as input and the system 100 may rerun the NRT graph simulation 182 in the expected logic (e.g., the design logic) to extract one or more feature values 190 from the graph data in the data store 140. The system 100 obtains the one or more feature values 184 and may then compare results 198 by comparing the one or more feature values 184 with the one or more feature values 190 to analyze and determine the accuracy between the design logic and the implemented logic. Additionally, based on the comparison, the system 100 may produce the parity report 196 as output including information corresponding to the audit code accuracy 194 between the expected and implemented logic.

For config-based NRT graph engineering features, the system 100 may research 402 (shown in FIG. 4) the feature logic by obtaining a query template 176 including one or more definitions 172 and the system 100 may modify/define the graph query 200 and may also modify/define the graph calculations 202 based on the query template 176. The system 100 may then create a feature set 208 from the data store such as, for example, feature data store 206 (shown in FIG. 10) and create/update the feature engineering request 204 to onboard the feature engineering. Creating/updating the feature engineering request 204 may include configuring events 150 and defining NRT graph features 192. In some embodiments, config-based NRT graph features 192 may include defining feature names, data types, and the feature engineering logic.

Based on the events 150 and NRT graph features 192, the system 100 may perform the NRT graph simulation 182 in the implemented logic such as, for example, in online production environment 148 with the seed file 174 and the reading PITs as input and produce one or more feature values 184, writing PITs, and context parameters as output. The system 100 may then validate 406 the results of the NRT graph simulation 182. In some embodiments, the system 100 may verify the results of the NRT graph simulation 182 with basic checks including, but not limited to, missing rate, not single value, or the like.

If the audit/verification process passes, the system 100 may provide the NRT graph features may be provided as output to be productized 408 (shown in FIG. 4) into the online production environment 148. If the audit/verification process does not pass, the system 100 may define/modify the graph query 200 and/or the graph calculations 202 and reperform the NRT graph simulation 182 with the design logic and the implemented logic until the features values provided as output passes the audit/verification process.

Figure 8:
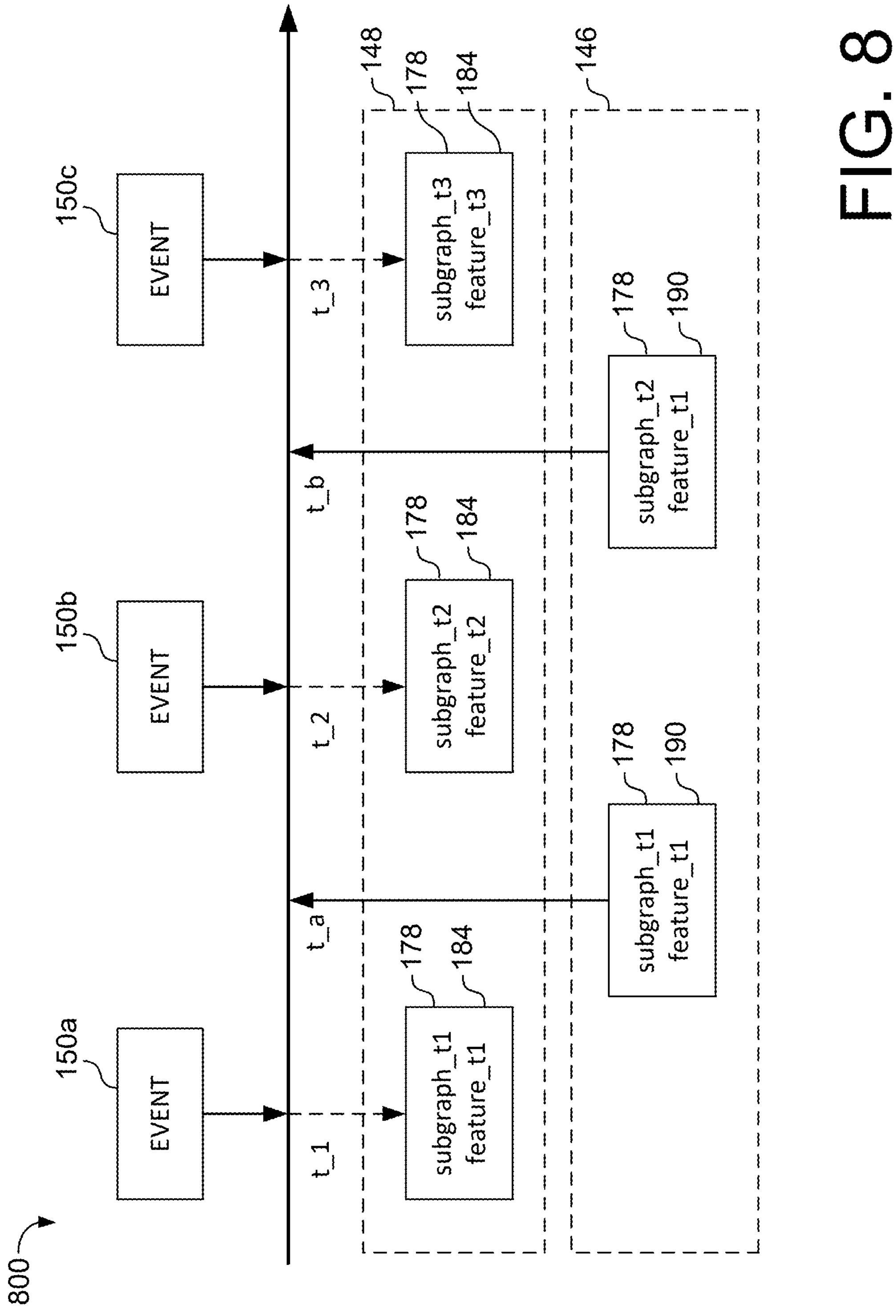
FIG. 8 is a graphical diagram illustrating the system that facilitates validating engineered graph feature logic, according to some embodiments.
Figure 9:
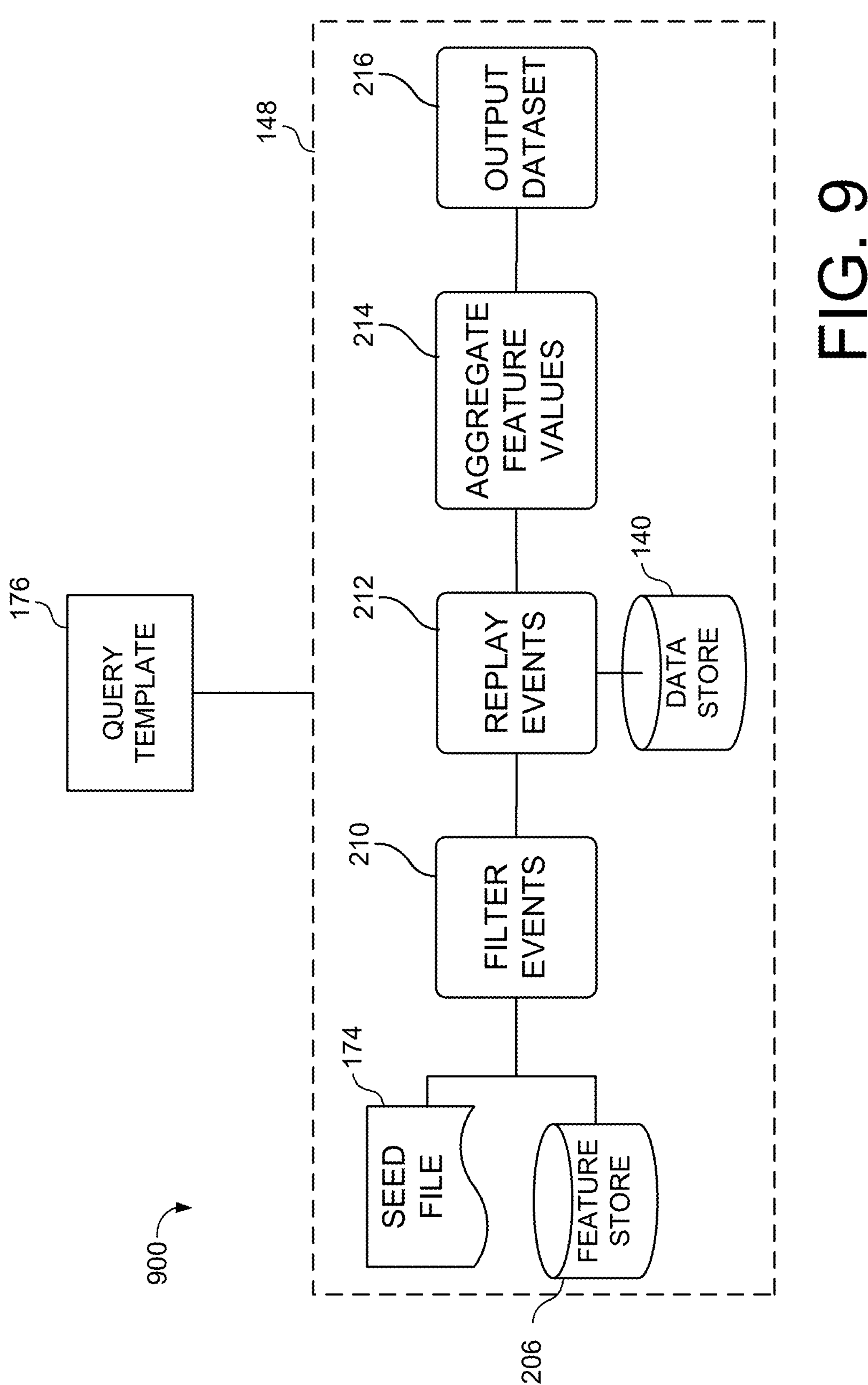
FIG. 9 is a block diagram illustrating a portion of the system that facilitates replaying events for the purposes of validating the graph feature logic, according to some embodiments.

FIG. 8 is a graphical diagram 800 illustrating the system 100 that facilitates validating the graph engineering logic, according to some embodiments. FIG. 9 is a block diagram 900 illustrating a portion of system 100 that facilitates replaying events for the purposes of validating the graph engineering logic, according to some embodiments. FIG. 10 is a block diagram 1000 illustrating the portion of system 100 that facilitates engineering graph features by performing graph simulations in different environments, according to some embodiments. Unless specifically referenced, FIGS. 8-10 will be described collectively.

When designing the NRT graph engineering features, the NRT graph simulations 182 performed by the system 100 may include a mismatch between the feature values 184 from online production environment 148 and the feature values 190 from offline production environment 146 and extracted from the graph data in data store 140. In this regard, the system 100 may be configured to obtain the event data from the data store 142 and to replay 156 the events 150 backwards to identify any updated feature values based on the PIT.

Referring to FIG. 8, for a given seed file 174, the system 100 may identify event 150*a*, event 150*b*, and event 150*c* as being defined in the query based on the PITs. For each of the events 150*a*, 150*b*, 150*c*, the system 100 may extract subgraphs 178 and feature values 184. As shown in FIG. 8, at time t_2, the system 100 performs the NRT graph simulation 182 with the implemented logic and extracts a subgraph 178, shown as subgraph_t2, and features 184, shown as feature_t2, based on the given seed file 174. At time t_b, the system 100 performs the NRT graph simulation 182 with the design logic (e.g., expected logic) on the data in data store 140 and extracts subgraph 178, shown as subgraph_t2, and features 190, shown as feature_t1, based on the given seed file 174. The system 100 may determine that the feature_t1 extracted with the design logic does not match feature_t2 extracted with the implemented logic. Accordingly, the graph query 200 and/or the graph calculations 202 defined/modified by the system 100 may not pass auditing/verification.

Referring to FIG. 9, based on the query template 176 and the seed file 174, the system 100 may query a feature data store 206 to determine the one or more events 150. The system 100 may then query the events 150 (shown in FIG. 3) in the data store 142, the system 100 filtering 210 the events 150 based on the seed file 174. The system 100 may obtain the one or more events 150 corresponding to the event 150 defined in the query template 176 and based on the seed file 174 and may replay 156 the events 150. The system 100 may then aggregate 214 the results to read the feature values and provide the one or more updated feature values 190 as an output dataset 216.

Referring to FIG. 10, the system 100 performs the NRT graph simulations 182 in the online production environment 148 based on the implemented logic and in the offline production environment 146 based on the design logic. In some embodiments, the implemented logic may be based on a coding language of the online production environment 148. In other embodiments, the expected logic may be based on a coding language of the offline production environment 146.

According to some embodiments, the system 100 may compute a logic 220 for performing the NRT graph simulation 182. In this regard, the system 100 may perform the NRT graph simulations 182 based on a common logic shared between the online production environment 148 and the offline production environment 146. Sharing a common logic enables the system 100 to provide improved parity between graph queries 200 performed in the offline production environment 146 and the online production environment 148 to reduce the likelihood of mismatches occurring, which may stem from issues associated with the offline production environment 146 and online production environment 148 including different logics to extract the one or more feature values 154 such as, for example, feature values 184 and feature values 190. Additionally, sharing the common logic may improve the accuracy of the validate 406 and auditing of the one or more feature values 184 and the one or more feature values 190 provided as output as a result of performing the NRT graph simulation 182 by the system 100.

Figure 11:
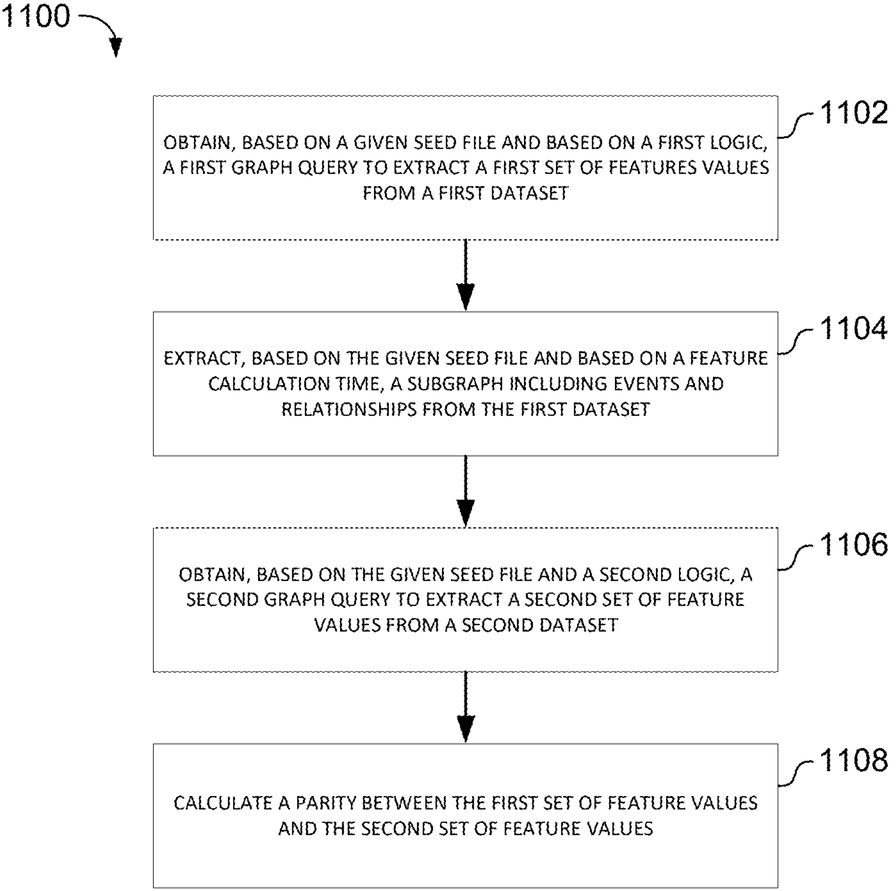
FIG. 11 illustrates a flow diagram of a method for designing and validating the graph feature logic using the system of FIG. 1, according to some embodiments.

FIG. 11 illustrates a flow diagram of a method 1100 for designing and validating a feature logic using the system 100 of FIG. 1, according to some embodiments.

At 1102, the method 1100 may include obtaining, based on a given seed file 174 and based on a first logic, a first graph query 200 to extract a first set of feature values 184 from a first dataset. Additionally, in some embodiments, a first data store 140 of the offline production environment 146 may include the first dataset.

The seed file 174 comprises a point-in-time (PIT) defining when to query each event 150 and corresponding feature values, according to some embodiments. Each event 150 is configured to trigger a binlog including a delta value indicative of a change in a feature value associated corresponding to the event 150.

In some embodiments, the method 1100 further includes obtaining a feature access time 188 defining when to query each event to extract the first set of feature values from the first dataset. The feature access time 188 may be defined as the PIT for when to access the one or more events 150, according to some embodiments. In some embodiments, the given seed file 174 may include the feature access time 188.

At 1104, the method 1100 may include extracting, based on the given seed file 174 and based on a feature calculation time 186, a sub-graph 178 including events 150 and relationships from the first dataset. The first dataset may be historical graph data stored in data store 140 and the graph simulation component 114 of system 100 may perform a NRT graph simulation 182 to extract the subgraph 178. The extracted data may include one or more feature values 184 and a feature calculation time 186 associated with each one or more feature values 184. In some embodiments, the method 1100 may further include determining a feature calculation time 186 corresponding to the time when sub-graph 178 is to be extracted from the first dataset.

At 1106, the method 1100, obtaining, based on the given seed file 174 and a second logic, a second graph query 200 to extract a second set of feature values 190 from a second dataset. In some embodiments, the second set of feature values 190 may be extracted based on the sub-graph 178 extracted from the first dataset. The second dataset may be historical graph data stored in data store 142 and the graph simulation component 114 of system 100 may perform the NRT graph simulation 182 on the data in the data store 142 to extract the second set of feature values 190. In some embodiments, the first logic is an expected logic and corresponds to an offline production environment 146 and the second logic is an implemented logic corresponds to an online production environment 148.

At 1108, the method 1100 may include calculating a parity 180 between the first set of feature values 184 and the second set of feature values 190. In some embodiments, calculating the parity 180 further includes calculating a match rate between the first set of feature values 184 and the second set of feature values 190, and determining, based on the match rate, that the second set of feature values 190 is not updated with a recent feature value.

In this regard, the method 1100 may further include obtaining, based on the given seed file 174, the events 150 from the data store 140 comprising the first dataset, the events 150 being filtered based on seed file 174, according to some embodiments. The method 1100 may further include replaying 212 the events 150 to determine whether any feature values in the second set of feature values 190 are not updated. Replaying 212 the events 150 includes replaying the obtained events 150 backwards and extracting a third set of feature values from the events 150, and determining whether any of the second set of feature values 190 do not match the third set of feature values and updating the second set of feature values 190 based on third set of feature values. In some embodiments, the second set of feature values 190 may be updated with the third set of feature values to mitigate a difference between the feature access time 188 and the feature calculation time 186.

In some embodiments, the method 1100 may further include obtaining a first set of data from a first source, obtaining a second set of data from a second source, and storing the first set of data and the second set of data in one or more data stores such as, for example, data store 140 and data store 142, and obtaining one or more graph queries defining a set of feature values to extract from the one or more data stores based on the seed file 174. In some embodiments, the first set of data may correspond to streaming data 136 and the second set of data may correspond to batch data 138. The system 100 obtains the first set of data and the second set of data and stores each of the first and second set of data in one or more data stores. In some embodiments, the system 100 may store the first and second set of data in data store 140. In other embodiments, the system 100 may store the first and second set of data in the data store 142.

Figure 12:
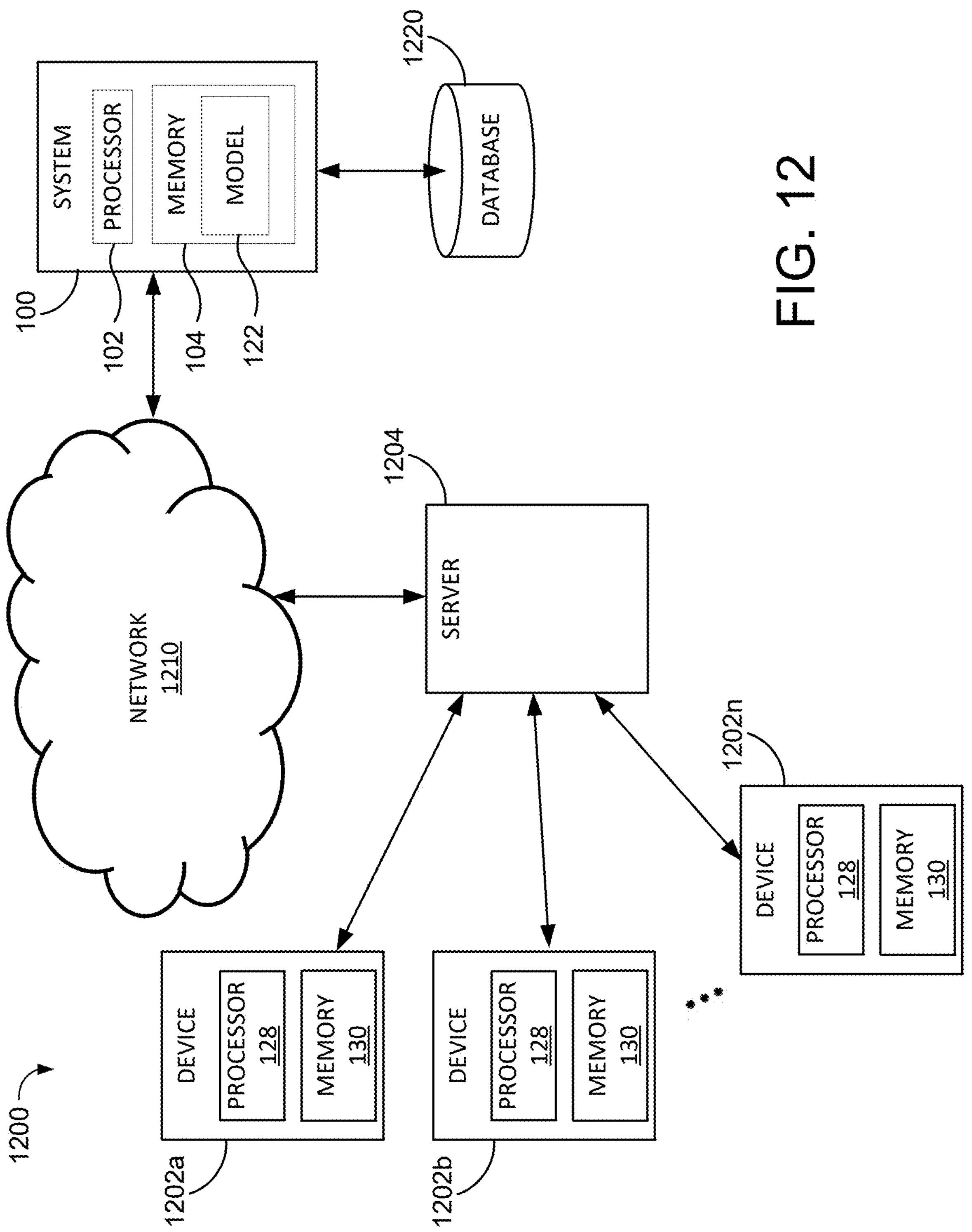
FIG. 12 illustrates a block diagram of a network based system, according to some embodiments.

Additionally, the first set of data may correspond to streaming data 136 accumulated incrementally throughout a first period of time, according to some embodiments. For example, the streaming data 136 may be obtained as the events 150 are triggered in the network of the system 100. The second set of data may correspond to batch data 138 obtained at an end of the first period of time, according to some embodiments. For example, the batch data 138 may be obtained by the system 100 once a day at 3 AM FIG. 12 illustrates a block diagram of a network based system 1200, according to some embodiments.

Not all of these components may be required to practice one or more embodiments, and variations in the arrangement and type of the components may be made without departing from the spirit or scope of various embodiments of the present disclosure. In various embodiments, the network based system 1200 may include the system 100 of FIG. 1. The system 100 may be in communicable connection with a network 1210 to send and receive information corresponding to one or more datasets with one or more other computing devices including computing device **1202*a*, computing device 1202*b*, and through computing device 1202*c* (hereinafter referred to as computing device 1202), which may also be in communicable connection with the network 1210 through server 1204. In some embodiments, the one or more other computing devices 1202 may be a computerized tool (e.g., any suitable combination of computer-executable hardware and/or computer-executable software) which can be configured to perform the one or more methods and techniques in accordance with the present disclosure. For example, in some embodiments, the computing device 1202 may be similar to computing device 124 in FIG. 1 and configured to, at least in part, to perform NRT graph simulations 182 on data. In another example, the computing device 1202 may be configured to, at least in part, obtain the streaming data 136 and batch data 138 and store the streaming data 136 and batch data 138 in a data store of the memory 130 and perform NRT graph simulations 182 on the data in data store of the memory 130**.

In some embodiments, the system 100 and the other computing devices 1202 may be any type of processor-based platforms that are connected to a network 1210 such as, without limitation, servers, personal computers, digital assistants, personal digital assistants, smart phones, pagers, digital tablets, laptop computers, Internet appliances, cloud-based processing platforms, and other processor-based devices either physical or virtual. In some embodiments, the system 100 and the other computing devices may be specifically programmed with one or more application programs in accordance with one or more principles/methodologies detailed herein. In some embodiments, the system 100 and the other computing devices may be specifically programmed with the ML component 122 in accordance with one or more principles/methodologies detailed herein. In some embodiments, the system 100 and the other computing devices may operate on any of a plurality of operating systems capable of supporting a browser or browser-enabled application, such as Microsoft™, Windows™, and/or Linux. In some embodiments, the computing device 1202 and/or the other computing devices each may include at least include a computer-readable medium, such as a random-access memory (RAM) or FLASH memory, coupled to a processor.

In some embodiments, the computing device 1202 shown may be accessed by, for example, the system 100 by executing a browser application program such as Microsoft Corporation's Internet Explorer™, Apple Computer, Inc.'s Safari™, Mozilla Firefox, and/or Opera to obtain live data from the network 1210. In some embodiments, the system 100 may communicate over the exemplary network 1210 with the computing device 1202 to obtain streaming data 136 and/or batch data 138 corresponding to ongoing interactions on the network 1210, and which may be analyzed by the system 100 or the other computing devices to perform the NRT graph feature engineering.

In some embodiments, the network based system 1200 may include at least one database 1220. The database 1220 may be any type of database, including a database managed by a database management system (DBMS). In some embodiments, an exemplary DBMS-managed database may be specifically programmed as an engine that controls organization, storage, management, and/or retrieval of data in the respective database. In some embodiments, the exemplary DBMS-managed database may be specifically programmed to provide the ability to query, backup and replicate, enforce rules, provide security, compute, perform change and access logging, and/or automate optimization. In some embodiments, the exemplary DBMS-managed database may be chosen from Oracle database, IBM DB2, Adaptive Server Enterprise, FileMaker, Microsoft Access, Microsoft SQL Server, MySQL, PostgreSQL, and a NoSQL implementation. In some embodiments, the exemplary DBMS-managed database may be specifically programmed to define each respective schema of each database in the exemplary DBMS, according to a particular database model of the present disclosure which may include a hierarchical model, network model, relational model, object model, or some other suitable organization that may result in one or more applicable data structures that may include fields, records, files, and/or objects. In some embodiments, the exemplary DBMS-managed database may be specifically programmed to include metadata about the data that is stored.

In some embodiments, the network based system 1200 may also include and/or involve one or more cloud components. Cloud components may include one or more cloud services such as software applications (e.g., queue, etc.), one or more cloud platforms (e.g., a Web front-end, etc.), cloud infrastructure (e.g., virtual machines, etc.), and/or cloud storage (e.g., cloud databases, etc.). In some embodiments, the computer-based systems/platforms, computer-based devices, components, media, and/or the computer-implemented methods of the present disclosure may be specifically configured to operate in or with cloud computing/architecture such as, but not limiting to infrastructure a service (IaaS), platform as a service (PaaS), and/or software as a service (SaaS).

As used herein, the terms "computer engine" and "engine" identify at least one software component and/or a combination of at least one software component and at least one hardware component which are designed/programmed/configured to manage/control other software and/or hardware components (such as the libraries, software development kits (SDKs), objects, etc.).

Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. In some embodiments, the one or more processors may be implemented as a Complex Instruction Set Computer (CISC) or Reduced Instruction Set Computer (RISC) processors; x86 instruction set compatible processors, multi-core, or any other microprocessor or central processing device (CPU). In various implementations, the one or more processors may be dual-core processor(s), dual-core mobile processor(s), and so forth.

Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores," may be stored on a tangible, machine readable medium and supplied to various customers or manufacturing facilities to load into the fabrication machines that make the logic or processor. Of note, various embodiments described herein may, of course, be implemented using any appropriate hardware and/or computing software languages (e.g., C++, Objective-C, Swift, Java, JavaScript, Python, Perl, QT, etc.).

In some embodiments, one or more of exemplary inventive computer-based systems/platforms, exemplary inventive computer-based devices, and/or exemplary inventive computer-based components of the present disclosure may include or be incorporated, partially or entirely into at least one personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

As used herein, the term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Cloud components and cloud servers are examples.

In some embodiments, as detailed herein, one or more of the computer-based systems of the present disclosure may obtain, manipulate, transfer, store, transform, generate, and/or output any digital object and/or data unit (e.g., from inside and/or outside of a particular application) that can be in any suitable form such as, without limitation, a file, a contact, a task, an email, a message, a map, an entire application (e.g., a calculator), data points, and other suitable data. In some embodiments, as detailed herein, one or more of the computer-based systems of the present disclosure may be implemented across one or more of various computer platforms such as, but not limited to: (1) Linux™, (2) Microsoft Windows™, (3) OS X (Mac OS), (4) Solaris™, (5) UNIX™ (6) VMWare™, (7) Android™, (8) Java Platforms™, (9) Open Web Platform, (10) Kubernetes or other suitable computer platforms. In some embodiments, illustrative computer-based systems or platforms of the present disclosure may be configured to utilize hardwired circuitry that may be used in place of or in combination with software instructions to implement features consistent with principles of the disclosure. Thus, implementations consistent with principles of the disclosure are not limited to any specific combination of hardware circuitry and software. For example, various embodiments may be embodied in many different ways as a software component such as, without limitation, a stand-alone software package, a combination of software packages, or it may be a software package incorporated as a "tool" in a larger software product.

For example, exemplary software specifically programmed in accordance with one or more principles of the present disclosure may be downloadable from a network, for example, a website, as a stand-alone product or as an add-in package for installation in an existing software application. For example, exemplary software specifically programmed in accordance with one or more principles of the present disclosure may also be available as a client-server software application, or as a web-enabled software application. For example, exemplary software specifically programmed in accordance with one or more principles of the present disclosure may also be embodied as a software package installed on a hardware device.

In some embodiments, exemplary inventive computer-based systems/platforms, exemplary inventive computer-based devices, and/or exemplary inventive computer-based components of the present disclosure may be configured to output to distinct, specifically programmed graphical user interface implementations of the present disclosure (e.g., a desktop, a web app., etc.). In various implementations of the present disclosure, a final output may be displayed on a displaying screen which may be, without limitation, a screen of a computer, a screen of a mobile device, or the like. In various implementations, the display may be a holographic display. In various implementations, the display may be a transparent surface that may receive a visual projection. Such projections may convey various forms of information, images, and/or objects. For example, such projections may be a visual overlay for a mobile augmented reality (MAR) application.

In some embodiments, exemplary inventive computer-based systems/platforms, exemplary inventive computer-based devices, and/or exemplary inventive computer-based components of the present disclosure may be configured to be utilized in various applications which may include, but not limited to, gaming, mobile-device games, video chats, video conferences, live video streaming, video streaming and/or augmented reality applications, mobile-device messenger applications, and others similarly suitable computer-device applications.

In some embodiments, the exemplary inventive computer-based systems/platforms, the exemplary inventive computer-based devices, and/or the exemplary inventive computer-based components of the present disclosure may be configured to securely store and/or transmit data by utilizing one or more of encryption techniques (e.g., private/public key pair, Triple Data Encryption Standard (3DES), block cipher algorithms (e.g., IDEA, RC2, RC5, CAST and Skipjack), cryptographic hash algorithms (e.g., MD5, RIP-EMD-200, RTRO, SHA-1, SHA-2, Tiger (TTH), WHIRL-POOL, RNGs).

The machine learning model as described in the various embodiments herein can be any suitable computer-implemented artificial intelligence algorithm that can be trained (e.g., via supervised learning, unsupervised learning, and/or reinforcement learning) to receive input data and to generate output data based on the received input data (e.g., neural network, linear regression, logistic regression, decision tree, support vector machine, naive Bayes, and/or so on). In various aspects, the input data can have any suitable format and/or dimensionality (e.g., character strings, scalars, vectors, matrices, tensors, images, and/or so on). Likewise, the output data can have any suitable format and/or dimensionality (e.g., character strings, scalars, vectors, matrices, tensors, images, and/or so on). In various embodiments, a machine learning model can be implemented to generate any suitable determinations and/or predictions in any suitable operational environment (e.g., can be implemented in a payment processing context, where the model receives payment data, transaction data, and/or customer data and determines/predicts whether given transactions are fraudulent, whether given customers are likely to default, and/or any other suitable financial determinations/predictions, and/or so on).

In some embodiments, a system includes a processor and a non-transitory computer readable medium having stored thereon instructions that are executable by the processor to cause the system to perform operations including to obtain, based on a given seed file and based on a first logic, a first graph query to extract a first set of feature values from a first dataset, extract, based on the given seed file and based on the feature calculation time, a sub-graph including events and relationships from the first dataset, obtain, based on the given seed file and a second logic, a second graph query to extract a second set of feature values from a second dataset, and calculate a parity between the first set of feature values and the second set of feature values.

In some embodiments, the second set of feature values is extracted based on the sub-graph extracted from the first dataset.

In some embodiments, the given seed file includes a point-in-time (PIT) defining when to query each event and corresponding feature values.

In some embodiments, each event is configured to trigger a binlog including a delta value indicative of a change in a feature value associated corresponding to each event.

In some embodiments, the operations further include to obtain a feature access time defining when to query each event to extract the first set of feature values from the first dataset; and determine a feature calculation time corresponding to the sub-graph being extracted from the first dataset.

In some embodiments, calculating the parity further includes to calculate a match rate between the first set of feature values and the second set of feature values, and determine, based on the match rate, that the second set of feature values is not updated with a recent feature value.

In some embodiments, the operations further include to obtain, based on the given seed file, the events from a first data store including the first dataset, the events being filtered based on the given seed file, replay the events backwards and extracting a third set of feature values, determine whether any of the second set of feature values do not match the second set of feature values, and update the second set of feature values based on third set of feature values. In some embodiments, the second set of feature values includes being updated with the third set of feature values to mitigate a difference between the feature access time and the feature calculation time.

In some embodiments, the first logic corresponds to an online networking environment and the second logic corresponds to an offline networking environment.

In some embodiments, a first data store in the online networking environment includes the first dataset and a second datastore in the offline networking environment includes the second dataset.

In some embodiments, a computer-implemented method for defining graph queries for a Point-in-time (PIT) using near real-time (NRT) data includes obtaining a first set of data from a first source, obtaining a second set of data from a second source, storing the first set of data and the second set of data in one or more data stores, and obtaining one or more graph queries defining a set of feature values to extract from the one or more data stores based on a seed file.

In some embodiments, obtaining the one or more graph queries defining the set of feature values to extract from the one or more data stores based on the seed file includes obtaining, based on a given seed file and a first logic, a first graph query to extract a first set of feature values from a first dataset and a feature access time defining when to query each event to extract the first set of feature values from the first dataset, extracting, based on the given seed file and based on a feature calculation time, a sub-graph including events and relationships from the first dataset, and obtaining, based on the given seed file and a second logic, a second graph query to extract a second set of feature values from a second dataset.

In some embodiments, the method further includes calculating a parity between the first set of feature values and the second set of feature values.

In some embodiments, calculating the parity between the first set of feature values and the second set of feature values further includes calculating a match rate between the first set of feature values and the second set of feature values, determining, based on the match rate, that the second set of feature values is not updated with a recent feature value, obtaining, based on the given seed file, the events from a first data store including the first dataset, the events being filtered based on the seed file, replaying the events backwards and extracting a third set of feature values, determining whether any of the second set of feature values do not match the second set of feature values, and updating the second set of feature values based on third set of feature values. In some embodiments, the second set of feature values includes being updated with the third set of feature values to mitigate a difference between the feature access time and the feature calculation time.

In some embodiments, the first set of data corresponds to streaming data accumulated incrementally throughout a first period of time, wherein the second set of data corresponds to batch data obtained at an end of the first period of time.

In some embodiments, a non-transitory computer readable medium having stored thereon instructions that are executable by a processor of a computing device to cause the computing device to perform operations including to obtain, based on a given seed file and based on a first logic, a first graph query to extract a first set of feature values from a first dataset and a feature access time defining when to query each event to extract the first set of feature values from the first dataset, extract, based on the given seed file and based on a feature calculation time, a sub-graph including events and relationships from the first dataset, obtain, based on the given seed file and a second logic, a second graph query to extract a second set of feature values from a second dataset, calculate a parity between the first set of feature values and the second set of feature values, obtain, based on the given seed file, the events from a first data store including the first dataset, the events being filtered based on the given seed file, replay the events backwards and extracting a third set of feature values, determine whether any of the second set of feature values do not match the second set of feature values, and update the second set of feature values based on third set of feature values.

In some embodiments, calculating the parity further includes to calculate a match rate between the first set of feature values and the second set of feature values, and determine, based on the match rate, that the second set of feature values is not updated with a recent feature value, wherein the second set of feature values includes being updated with the third set of feature values to mitigate a difference between the feature access time and the feature calculation time.

In some embodiments, the operations further include to obtain a feature access time defining when to query each event to extract the first set of feature values from the first dataset and determine a feature calculation time corresponding to the sub-graph being extracted from the first dataset.

In some embodiments, the second set of feature values is extracted based on the sub-graph extracted from the first dataset.

In some embodiments, the given seed file includes a point-in-time (PIT) defining when to query each event and corresponding feature values.

In some embodiments, each event is configured to trigger a binlog including a delta value indicative of a change in a feature value associated corresponding to each event.

All prior patents and publications referenced herein are incorporated by reference in their entireties.

Throughout the specification and claims, the following terms take the meanings explicitly associated herein, unless the context clearly dictates otherwise. The phrases “in one embodiment,” “in an embodiment,” and “in some embodiments” as used herein do not necessarily refer to the same embodiment(s), though it may. Furthermore, the phrases “in another embodiment" and "in some other embodiments" as used herein do not necessarily refer to a different embodiment, although it may. All embodiments of the disclosure are intended to be combinable without departing from the scope or spirit of the disclosure.

As used herein, the term "based on" is not exclusive and allows for being based on additional factors not described, unless the context clearly dictates otherwise. In addition, throughout the specification, the meaning of "a," "an," and "the" include plural references. The meaning of "in" includes "in" and "on."

What is claimed is:

1. A system comprising:

a processor; and a non-transitory computer readable medium having stored thereon instructions that are executable by the processor to cause the system to perform operations comprising:

obtain, based on a given seed file and based on a first logic, a first graph query to extract a first set of feature values from a first dataset;

extract, based on the given seed file and based on a feature calculation time, a sub-graph including events and relationships from the first dataset;

obtain, based on the given seed file and a second logic, a second graph query to extract a second set of feature values from a second dataset; and calculate a parity between the first set of feature values and the second set of feature values.

2. The system according to claim 1, wherein the second set of feature values is extracted based on the sub-graph extracted from the first dataset.

3. The system according to claim 1, wherein the given seed file comprises a point-in-time (PIT) defining when to query each event and corresponding feature values.

4. The system according to claim 1, wherein each event is configured to trigger a binlog including a delta value indicative of a change in a feature value associated corresponding to each event.

5. The system according to claim 1, wherein the operations further comprise:

obtain a feature access time defining when to query each event to extract the first set of feature values from the first dataset; and determine a feature calculation time corresponding to the sub-graph being extracted from the first dataset.

6. The system according to claim 5, wherein calculating the parity further comprises:

calculate a match rate between the first set of feature values and the second set of feature values; and determine, based on the match rate, that the second set of feature values is not updated with a recent feature value.

7. The system according to claim 6, further comprising:

obtain, based on the given seed file, the events from a first data store comprising the first dataset, the events being filtered based on the given seed file;

replay the events backwards and extracting a third set of feature values;

determine whether any of the second set of feature values do not match the second set of feature values; and update the second set of feature values based on third set of feature values;

wherein the second set of feature values comprises being updated with the third set of feature values to mitigate a difference between the feature access time and the feature calculation time.

8. The system according to claim 1, wherein the first logic corresponds to an online networking environment and the second logic corresponds to an offline networking environment.

9. The system according to claim 8, wherein a first data store in the online networking environment comprises the first dataset and a second datastore in the offline networking environment comprises the second dataset.

10. A non-transitory computer readable medium having stored thereon instructions that are executable by a processor of a computing device to cause the computing device to perform operations comprising:

obtain, based on a given seed file and based on a first logic, a first graph query to extract a first set of feature values from a first dataset and a feature access time defining when to query each event to extract the first set of feature values from the first dataset;

extract, based on the given seed file and based on a feature calculation time, a sub-graph including events and relationships from the first dataset;

obtain, based on the given seed file and a second logic, a second graph query to extract a second set of feature values from a second dataset;

calculate a parity between the first set of feature values and the second set of feature values;

obtain, based on the given seed file, the events from a first data store comprising the first dataset, the events being filtered based on the given seed file;

replay the events backwards and extracting a third set of feature values;

determine whether any of the second set of feature values do not match the second set of feature values; and update the second set of feature values based on third set of feature values.

11. The computing device according to claim 10, wherein calculating the parity further comprises:

calculate a match rate between the first set of feature values and the second set of feature values; and determine, based on the match rate, that the second set of feature values is not updated with a recent feature value;

wherein the second set of feature values comprises being updated with the third set of feature values to mitigate a difference between the feature access time and the feature calculation time.

12. The computing device according to claim 11, wherein the operations further comprise:

obtain a feature access time defining when to query each event to extract the first set of feature values from the first dataset; and determine a feature calculation time corresponding to the sub-graph being extracted from the first dataset.

13. The computing device according to claim 10, wherein the second set of feature values is extracted based on the sub-graph extracted from the first dataset.

14. The computing device according to claim 10, wherein the given seed file comprises a point-in-time (PIT) defining when to query each event and corresponding feature values.

15. The computing device according to claim 10, wherein each event is configured to trigger a binlog including a delta value indicative of a change in a feature value associated corresponding to each event.

16. A computer-implemented method comprising:

obtaining, by a computing device, based on a given seed file and based on a first logic, a first graph query to extract a first set of feature values from a first dataset and a feature access time defining when to query each event to extract the first set of feature values from the first dataset;

extracting, by the computing device, based on the given seed file and based on a feature calculation time, a sub-graph including events and relationships from the first dataset;

obtaining, by the computing device, based on the given seed file and a second logic, a second graph query to extract a second set of feature values from a second dataset;

calculating, by the computing device, a parity between the first set of feature values and the second set of feature values;

obtaining, by the computing device, based on the given seed file, the events from a first data store comprising the first dataset, the events being filtered based on the given seed file;

replaying, by the computing device, the events backwards and extracting a third set of feature values;

determining, by the computing device, whether any of the second set of feature values do not match the second set of feature values; and updating, by the computing device, the second set of feature values based on the third set of feature values.

17. The computer-implemented method according to claim 16, wherein calculating the parity comprises:

calculating a match rate between the first set of feature values and the second set of feature values; and determining, based on the match rate, that the second set of feature values is not updated with a recent feature value;

wherein updating the second set of feature values based on the third set of feature values is to mitigate a difference between the feature access time and the feature calculation time.

18. Computer-implemented method according to claim 17, further comprising:

obtaining, by the computing device, a feature access time defining when to query each event to extract the first set of feature values from the first dataset; and determining, by the computing device, a feature calculation time corresponding to the sub-graph being extracted from the first dataset.

19. The computer-implemented method according to claim 16, wherein the second set of feature values is extracted based on the sub-graph extracted from the first dataset.

20. The computer-implemented method according to claim 16, wherein the given seed file comprises a point-in-time (PIT) defining when to query each event and corresponding feature values.

* * * * *